(12) United States Patent
Yoon et al.

(10) Patent No.: US 10,718,882 B2
(45) Date of Patent: Jul. 21, 2020

(54) PROXIMITY SENSING APPARATUS IN ELECTRONIC DEVICE AND METHOD THEREOF

(71) Applicant: Samsung Electronics Co., Ltd., Gyeonggi-do (KR)

(72) Inventors: Hee-Woong Yoon, Seoul (KR); Jeong-Ho Cho, Gyeonggi-do (KR); Jongah Kim, Gyeonggi-do (KR); Jin-Hee Won, Gyeonggi-do (KR); Donghan Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 216 days.

(21) Appl. No.: 15/806,981

(22) Filed: Nov. 8, 2017

(65) Prior Publication Data

US 2018/0136363 A1    May 17, 2018

(30) Foreign Application Priority Data

Nov. 14, 2016  (KR) .......................... 10-2016-0151034

(51) Int. Cl.
| | | |
|---|---|---|
| *G01J 3/46* | (2006.01) | |
| *G01V 8/12* | (2006.01) | |
| *G06F 1/3234* | (2019.01) | |
| *G06F 1/3231* | (2019.01) | |
| *G06F 1/3215* | (2019.01) | |

(Continued)

(52) U.S. Cl.
CPC .................. *G01V 8/12* (2013.01); *G01J 3/46* (2013.01); *G01S 17/04* (2020.01); *G06F 1/325* (2013.01); *G06F 1/3215* (2013.01); *G06F 1/3231* (2013.01); *G06F 1/3265* (2013.01); *H04M 1/72569* (2013.01); *H04W 52/027* (2013.01); *H04W 52/0254* (2013.01); *H04M 2250/12* (2013.01); *Y02D 10/153* (2018.01); *Y02D 10/173* (2018.01)

(58) Field of Classification Search
CPC ............ H05B 33/0809; H05B 33/0824; H05B 33/083; H05B 33/0845; H05B 33/0851; H05B 39/044; E02D 17/20; G01J 3/46; G01S 17/026; G01V 8/12; G06F 1/3215; G06F 1/3231; G06F 1/325; G06F 1/3265; H04M 1/72569; H04M 2250/12; H04W 52/0254; H04W 52/027; Y02A 10/24; Y02A 50/16; Y02D 10/153; Y02D 10/173
USPC ........................................................ 356/425
See application file for complete search history.

(56) References Cited

U.S. PATENT DOCUMENTS

| | | |
|---|---|---|
| 9,088,282 B2 | 7/2015 | Holenarsipur et al. |
| 9,106,756 B2 | 8/2015 | Kim et al. |

(Continued)

FOREIGN PATENT DOCUMENTS

| | | | |
|---|---|---|---|
| CN | 103945068 | * | 7/2014 |
| CN | 104811547 | | 7/2015 |

OTHER PUBLICATIONS

European Search Report dated Mar. 9, 2018 issued in counterpart application No. 17201223.9-1221, 9 pages.

*Primary Examiner* — Sunghee Y Gray
(74) *Attorney, Agent, or Firm* — The Farrell Law Firm, P.C.

(57) ABSTRACT

Disclosed is an electronic device and a method for sensing proximity in an electronic device, which reduces an error in sensing a proximity distance by considering a color of an object when sensing the proximity distance to the object based on an amount of light reflected from the object.

14 Claims, 19 Drawing Sheets

(51) Int. Cl.
*H04W 52/02* (2009.01)
*H04M 1/725* (2006.01)
*G01S 17/04* (2020.01)

(56) References Cited

U.S. PATENT DOCUMENTS

| | | | |
|---|---|---|---|
| 9,263,618 B2 | 2/2016 | Ruh | |
| 2005/0008243 A1* | 1/2005 | Fujino | G03G 15/50 |
| | | | 382/254 |
| 2008/0167834 A1 | 7/2008 | Herz et al. | |
| 2012/0092670 A1* | 4/2012 | Chatow | G01J 3/501 |
| | | | 356/402 |
| 2014/0062896 A1 | 3/2014 | Vieta | |
| 2015/0123887 A1* | 5/2015 | Shadle | G06F 3/14 |
| | | | 345/102 |
| 2018/0009374 A1* | 1/2018 | Kim | B60Q 1/2607 |

\* cited by examiner

PROXIMITY SENSING APPARATUS IN ELECTRONIC DEVICE AND METHOD THEREOF

PRIORITY

The present application claims priority under 35 U.S.C. § 119 to a Korean Patent Application filed in the Korean Intellectual Property Office on Nov. 14, 2016 and assigned Serial No. 10-2016-0151034, the contents of which are incorporated herein by reference.

BACKGROUND

1. Field of the Disclosure

The present disclosure relates generally to an electronic device, and more particularly, to an apparatus and a method for sensing proximity in an electronic device.

2. Description of the Related Art

Proximity sensors generally sense the location of an object when the object approaches, and are mounted in various electronic devices such as smart phones and tablets. Proximity-related signals outputted from a proximity sensor may be used for various functions of the electronic device. For example, a smart phone may deactivate a screen when the proximity of a user is identified through a proximity sensor during a call.

The proximity sensor may include a light emitting unit for outputting light and a light receiving unit for receiving light reflected from an object and generating an electric signal. The light receiving unit may generate an electric signal, such as a digital value, according to an amount of light reflected from the object. For example, as a distance between the proximity sensor and the object decreases, the amount of light reflected from the object and entering the proximity sensor increases and the digital value generated from the light receiving unit of the proximity sensor may also increase based on the amount of light. This enables the electronic device to determine the proximity between the electronic device and the object. For example, when the digital value increases, the electronic device may determine that the object is closer to the electronic device.

However, since the amount of light reflected from the object may differ according to the color of the object (or surface color) corresponding to the proximity sensor, the foregoing method of sensing a proximity distance is unreliable.

For example, a digital value generated by the light receiving unit of the proximity sensor based on an amount of light reflected from a first object having a low light absorption rate color, such as white, when the first object is separated from the proximity sensor by 1 centimeter (cm) is different from a digital value which is generated by the light receiving unit of the proximity sensor based on an amount of light reflected from a second object having a relatively high light absorption rate color, such as black, when the 15 second object is separated from the proximity sensor by the same 1 cm distance. Although the two objects are located at the same distance away from the proximity sensor, different digital values are outputted from the proximity sensor, and therefore, the electronic device may recognize different proximity distances to the first and second objects.

Thus, there is a need in the art for a proximity sensor that more reliably and consistently senses proximity distances in an electronic device.

SUMMARY

The present disclosure has been made to address at least the above-mentioned problems and/or disadvantages and to provide at least the advantages described below.

Accordingly, an aspect of the present disclosure is to provide an apparatus and a method for sensing proximity in an electronic device, which reduces an error in sensing a proximity distance by considering a color of an object when sensing the proximity distance to the object based on an amount of light reflected from the object.

Another aspect of the present disclosure provides an apparatus and a method for sensing proximity in an electronic device, which increases accuracy when determining proximity or remoteness of an object based on an amount of light reflected from the object, by adjusting a reference value criterion for determining the proximity or remoteness of the object, based on a color of the object.

Another aspect of the present disclosure provides an apparatus and a method for sensing proximity in an electronic device, which increases accuracy and efficient use of power when determining proximity or remoteness of an object based on an amount of light reflected from the object, by adjusting power of a light source based on a color of the object.

According to an aspect of the present disclosure, there is provided an electronic device including at least one sensor configured to acquire color information of an object, a light emitting unit configured to output light of at least one wavelength band, a light receiving unit configured to receive the light of the at least one wavelength band, a processor electrically connected with the at least one sensor, the light emitting unit, and the light receiving unit and a memory electrically connected with the processor and storing instructions, wherein, the instructions, when being executed, cause the processor to acquire the color information of the object using the at least one sensor, determine an output intensity of the light emitting unit or at least one threshold value based on the acquired color information of the object and determine proximity or remoteness of the object relative to the electronic device based on light scattered or reflected from the object received by the light receiving unit, by using the determined output intensity of the light emitting unit or the at least one threshold value.

According to another aspect of the present disclosure, there is provided a method for operating of an electronic device, the method including acquiring color information of an object, determining an output intensity of a light emitting unit or at least one threshold value based on the acquired color information of the object, and determining proximity or remoteness of the object relative to the electronic device based on the light scattered or reflected from the object received by a light receiving unit, by using the determined output intensity of the light emitting unit or the at least one threshold value.

According to another aspect of the present disclosure, there is provided a method for operating an electronic device, including selecting a color sensing mode when a specific application is executed, outputting light of at least one wavelength band through a light emitting unit, based on the color sensing mode, receiving at least a part of light scattered or reflected from an object through a light receiving unit, based on the color sensing mode, determining a color of the object from the light received through the light receiving unit, based on the color sensing mode, selecting a proximity sensing mode when the color of the object is determined, outputting light of at least one wavelength band through the light emitting unit, based on the proximity sensing mode, receiving at least a part of light scattered or reflected from the object through the light receiving unit, based on the proximity sensing mode, and determining proximity or remoteness of the object relative to the electronic device by comparing a value corresponding the light received through the light receiving unit and at least one threshold value, based on the proximity sensing mode, wherein an output intensity of the light emitting unit or the at least one threshold value is determined based on the determined color or the object.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
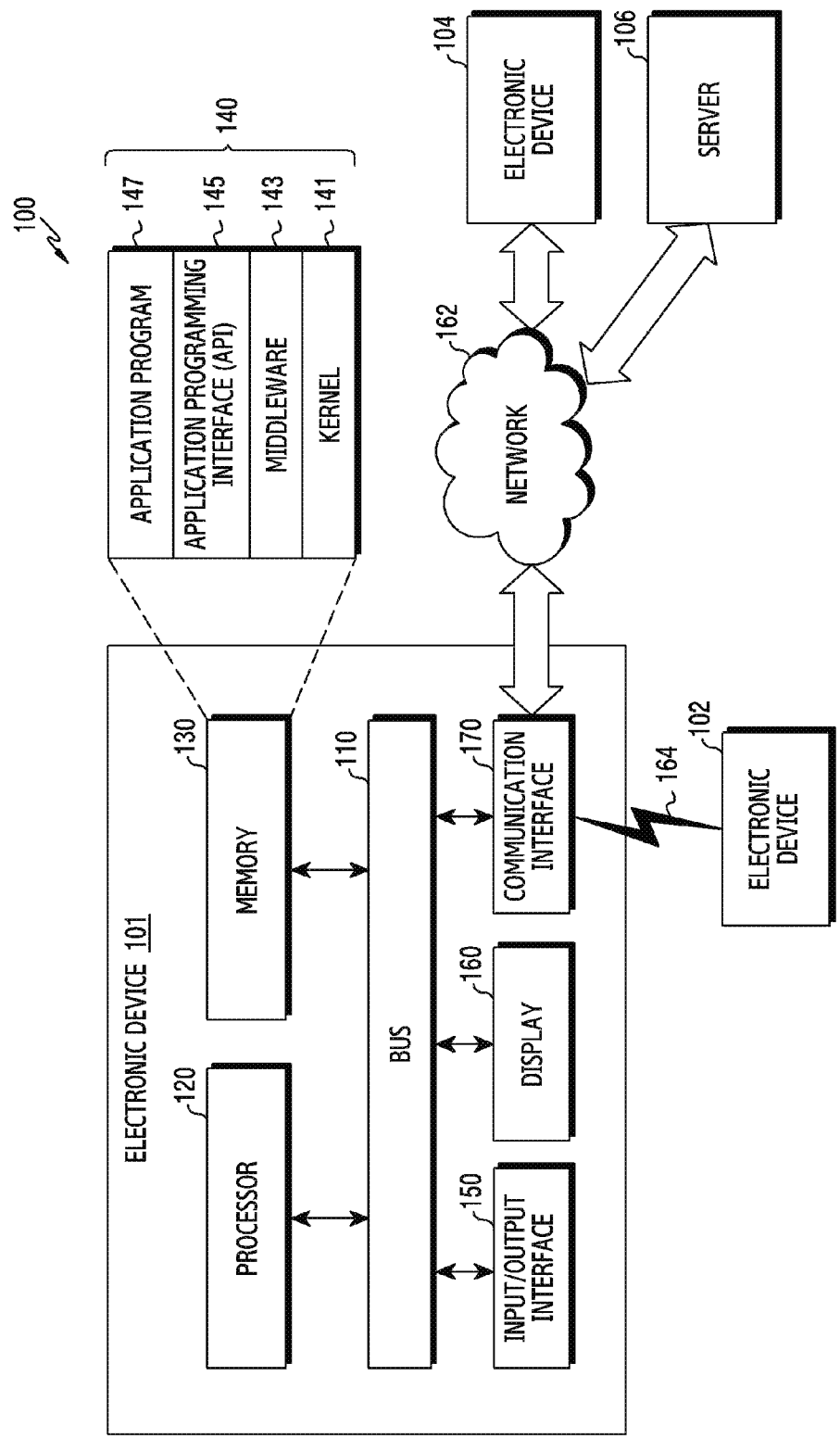
FIG. 1 is a block diagram of a network environment system according to an embodiment of the present disclosure.

Embodiments of the present disclosure will be described herein below with reference to the accompanying drawings. However, embodiments and terms used herein are not intended to limit the technical features described in the present disclosure to specific embodiments, and should be construed as including modifications, equivalents and/or alternatives of embodiments of the present disclosure.

In the description of the drawings, similar reference numerals are used for similar elements. Expressions of a singular form may include plural forms unless otherwise specified. For example, the expressions "A or B" or "at least one of A and/or B" used in the present disclosure include any and all combinations of the associated listed items. Terms such as "first" and "second" may be used in embodiments of the present disclosure to modify corresponding elements regardless of the order or importance of the elements, and to distinguish one element from another element and do not limit the corresponding elements. It will be understood that when a first element is described as being "operatively or communicatively coupled with/to" or "connected to" a second element, the first element may be directly coupled or connected to the second element, or there may be an intervening third element between the first and second elements.

The expression "configured (or set) to . . . " used in embodiments may be interchangeably used with the expressions "suitable for . . . ," "having the capacity to . . . ," "adapted to . . . ," "made to . . . ," "capable of . . . ," or "designed to" depending on the situation. The expression "a device configured to . . . " may indicate "the device being capable of . . . " with other devices or parts. For example, "a processor configured (set) to perform A, B, and C" may indicate an embedded processor for performing a corresponding operation, or a generic-purpose processor, such as a central processing unit (CPU) or an application processor (AP) for performing corresponding operations by executing one or more software programs stored in a memory device.

An electronic device according to embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), a motion picture experts group (MPEG)-1 or 2 audio layer 3 (MP3) players, medical devices, cameras, or wearable devices. The wearable devices may include at least one of accessories (e.g., watches, rings, bracelets, ankle bracelets, necklaces, glasses, contact lenses, head-mounted-devices (HMDs), etc.), fabric- or clothing-mounted devices (e.g., electronic apparels), body-mounted devices (e.g., skin pads, tattoos, etc.), and bio-implantable circuits. According to some embodiments, the electronic devices may include at least one of televisions (TVs), a digital video disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, and electronic picture frames.

According to another embodiment, the electronic devices may include at least one of portable medical measurement devices, such as a blood glucose monitoring device, a heartbeat measuring device, a blood pressure measuring device, and a body temperature measuring device, a magnetic resonance angiography (MRA), a magnetic resonance imaging (MRI), a computed tomography (CT), scanners, and ultrasonic devices, navigation devices, global navigation satellite systems (GNSS), event data recorders (EDRs), flight data recorders (FDRs), vehicle infotainment devices, electronic equipment for vessels, such as navigation systems and gyrocompasses, avionics, security devices, head units for vehicles, industrial or home robots, automated teller machines (ATMs), point of sales (POSs) devices, or Internet of things devices, such as light bulbs, various sensors, sprinkler devices, fire alarms, thermostats, street lamps, toasters, exercise equipment, hot water tanks, heaters, and boilers. The electronic devices may include at least one of furniture, a part of buildings/structures or cars, electronic boards, electronic signature receiving devices, projectors, or various measuring instruments, such as water, electricity, gas, or wave meters. The electronic devices may be flexible or may be a combination of two or more devices of the above-mentioned devices, but are not limited to the above-mentioned devices. In the present disclosure, the term "user" may refer to a person who uses the electronic device or an artificial intelligence electronic device that uses the electronic device.

FIG. 1 is a block diagram of a network environment system according to an embodiment of the present disclosure.

Referring to FIG. 1, there is illustrated an electronic device 101 in a network environment 100 and may include a bus 110, a processor 120, a memory 130, an input/output interface 150, a display 160, and a communication interface 170. The electronic device 101 may not include at least one of the above-described elements or may further include other element(s). The bus 110 may interconnect the above-described elements 120, 130, 150, 160, and 170 and may include a circuit for conveying communications, such as a control message or data, among the above-described elements. The processor 120 may include one or more of a central processing unit (CPU), an application processor (AP), or a communication processor (CP) and may perform an operation or data processing associated with control and/or communication of at least one other element(s) of the electronic device 101.

The memory 130 may include a volatile memory and/or nonvolatile memory, may store instructions or data associated with at least one other element(s) of the electronic device 101. For example, the memory 130 may store software and/or a program 140 including a kernel 141, a middleware 143, an application programming interface (API) 145, and/or applications 147. At least a portion of the kernel 141, the middleware 143, or the API 145 may be referred to as an operating system (OS). The kernel 141 may control or manage system resources, such as the bus 110, the processor 120, and the memory 130, that are used to execute operations or functions of other programs, such as the middleware 143, the API 145, and the applications 147. The kernel 141 may provide an interface that enables the middleware 143, the API 145, or the applications 147 to access discrete elements of the electronic device 101 so as to control or manage system resources.

The applications 147 may include an analysis application for analyzing a thing using a spectrum sensing device. For example, the analysis application may acquire information on user's skin such as skin moisture, skin melanin, or erythema using the spectrum sensing device.

The applications 147 may sense a proximity distance to an object using a color sensing device (or a color sensor) and a proximity sensing device (or a proximity sensor).

The middleware 143 may mediate such that the API 145 or the at least one of the applications 147 communicates with the kernel 141 to exchange data. Furthermore, the middleware 143 may process one or more task requests received from at least one of the applications 147 according to a priority. For example, the middleware 143 may assign the priority, which enables use of a system resource such as the bus 110, the processor 120, the memory 130 or the like of the electronic device 101, to at least one of the applications 147, and may process the one or more task requests. The API 145 may be an interface through which at least one of the applications 147 controls a function provided by the kernel 141 or the middleware 143, and may include at least one interface or function for a file control, a window control, image processing, or a character control. The input/output interface 150 may transmit an instruction or data, inputted from a user or another external device, to other element(s) of the electronic device 101, and may output an instruction or data, received from other element(s) of the electronic device 101, to a user or another external device.

The display 160 may include a liquid crystal display (LCD), a light-emitting diode (LED) display, an organic LED (OLED) display, a microelectromechanical systems (MEMS) display, or an electronic paper display, may display various contents to a user, such as a text, an image, a video, an icon, and/or a symbol. According to an embodiment, the display 160 may include a touch screen that receives a touch, gesture, proximity, or hovering input using an electronic pen or a portion of a user's body. The communication interface 170 may establish communication between the electronic device 101 and an external device, such as the first external electronic device 102, the second electronic device 104, or the server 106. For example, the communication interface 170 may be coupled to a network 162 through wireless communication or wired communication to communicate with the external device.

The wireless communication may include cellular communication using at least one of long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM). According to various embodiments, the wireless communication may include short range communication 164, such as wireless fidelity (WiFi), Bluetooth®, Bluetooth low energy (BLE), Zigbee®, near field communication (NFC), magnetic secure transmission, radio frequency (RF), or a body area network (BAN). The wireless communication may include a global navigation satellite system (GNSS) including a global positioning system (GPS), a global navigation satellite system (Glonass), Beidou navigation satellite system or Galileo, the European global satellite-based navigation system. Hereinafter, "GPS" and "GNSS" may be interchangeably used. The wired communication may include at least one of a universal serial bus (USB), a high-definition multimedia interface (HDMI), a recommended standard-232 (RS-232), power line communication, or a plain old telephone service (POTS). The network 162 may include at least one of telecommunications networks including local area network (LAN) or wide area network (WAN), the Internet, or a telephone network.

Each of the first and second external electronic devices 102 and 104 may be the same or different type of device as or from the electronic device 101. According to various embodiments, all or a part of operations that the electronic device 101 will perform may be executed by another or plural other electronic devices (for example, electronic devices 102, 104, or server 106), when the electronic device 101 executes any function or service automatically or in response to a request, the electronic device 101 may not perform the function or the service internally, but, alternatively or additionally, it may request at least a portion of a function associated with the electronic device 101 at another device which may execute the requested function or an additional function and may transmit the execution result to the electronic device 101 that provides the requested function or service using the received result or by additional processing. To achieve this, cloud computing, distributed computing, or client-server computing may be used.

Figure 2:
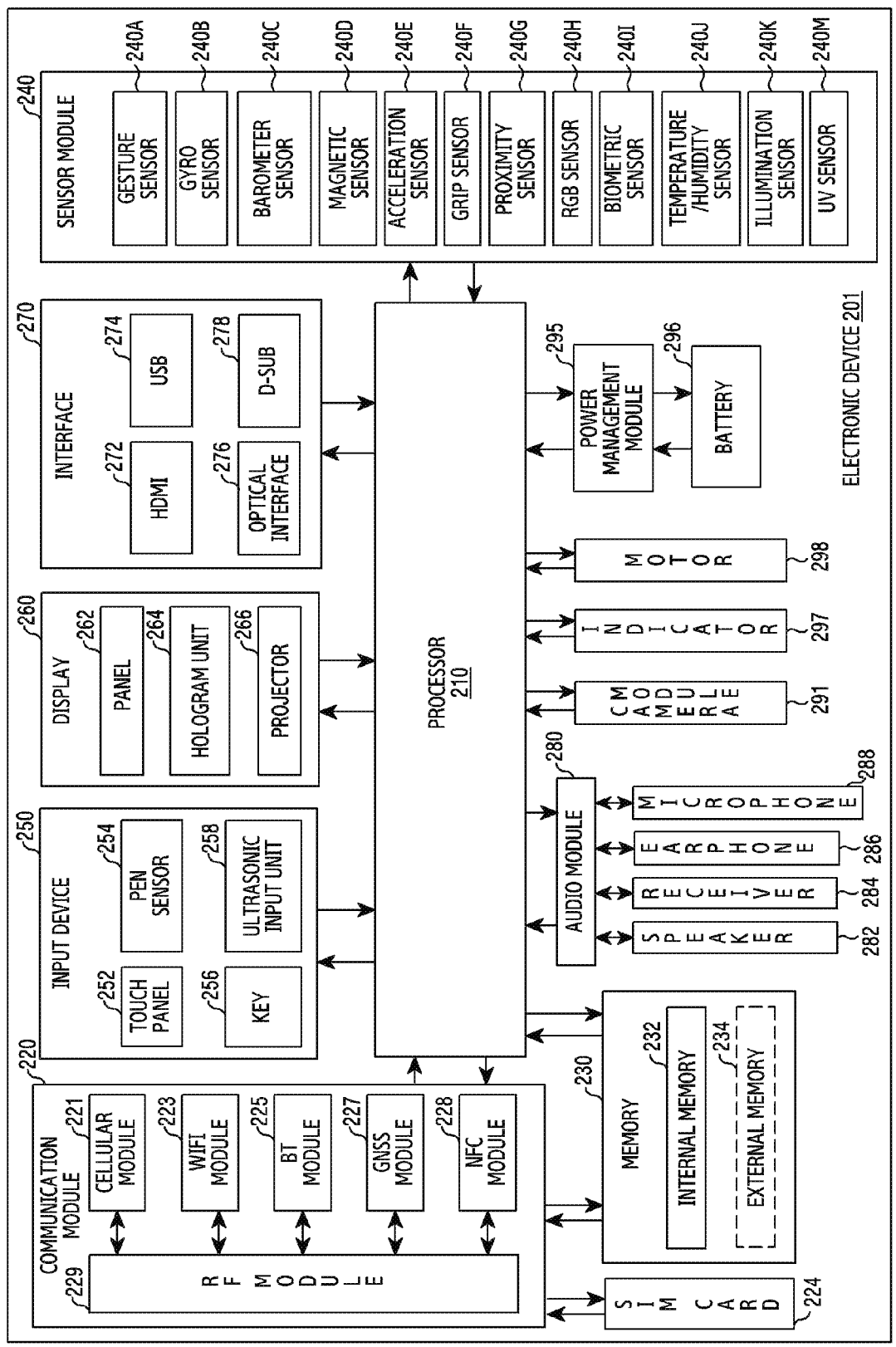
FIG. 2 is a block diagram of an electronic device according to embodiments of the present disclosure.

FIG. 2 is a block diagram of an electronic device 201 according to embodiments of the present disclosure. The electronic device 201 may include all or a part of the electronic device 101 illustrated in FIG. 1. The electronic device 201 may include one or more processors 210, such as an AP, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, or a motor 298.

The processor 210 may drive an OS or an application program to control a plurality of hardware or software elements connected to the processor 210 and may process and compute a variety of data. The processor 210 may be implemented with a system on chip (SoC), for example. The processor 210 may further include a graphic processing unit (GPU) and/or an image signal processor. The processor 210 may include at least a part of elements illustrated in FIG. 2. The processor 210 may load and process an instruction or data, which is received from at least one of other elements at a volatile memory, and may store resulting data at a nonvolatile memory. The processor 210 may include a microprocessor or any suitable type of processing circuitry, such as one or more general-purpose processors including advanced reduced instruction set computer machine (ARM)-based processors, a digital signal processor (DSP), a programmable logic device (PLD), an application-specific integrated circuit (ASIC), a field-programmable gate array (FPGA), a graphical processing unit (GPU), and a video card controller.

When a general purpose computer accesses code for implementing the processing shown herein, the execution of the code transforms the general purpose computer into a special purpose computer for executing the processing shown herein. Any of the functions and steps provided in the figures may be implemented in hardware, software or a combination of both and may be performed in entirety or in part within the programmed instructions of a computer. In addition, an artisan understands and appreciates that a "processor" or "microprocessor" may be hardware in the claimed disclosure.

According to an embodiment, when a proximity sensing light source is set to be driven by a fixed light output power (a driving power or a driving current), the processor 210 may control the light source to output light to the outside, and may determine whether an object moves within a proximity recognition distance separated from at least one light sensor or the electronic device 201 from out of the proximity recognition distance, by comparing a sensing value (or a digital value) generated by the at least one light sensor, such as a spectrum or proximity sensor, based on an amount of light scattered or reflected from the object, and a proximity recognition threshold value selected based on a color of the object. The expression "spectrum sensor" used in embodiments may be interchangeably used with the expressions "spectrometric sensor", "spectroscopy sensor" or "spectral sensor".

According to an embodiment, when the proximity sensing light source is set to be driven by the fixed light output power, the processor 210 may control the light source to output light to the outside, and may determine whether an object moves out of a proximity cancellation distance separated from the at least one light sensor from within the proximity cancellation distance, by comparing a sensing value generated by the at least one light sensor based on an amount of light scattered or reflected from the object and a proximity cancellation threshold value selected based on a color of the object.

According to another embodiment, when the light output power of the proximity sensing light source is set to be adjusted according to a color of an object, the processor 210 may control the light source to output light to the outside, and may determine whether an object moves within a proximity recognition distance separated from the at least one light sensor from out of the proximity recognition distance, by comparing a sensing value generated by the at least one light sensor based on an amount of light scattered or reflected from the object, and a fixed proximity recognition threshold value.

When the light output power of the proximity sensing light source is set to be adjusted according to a color of an object, the processor 210 may control the light source to output light to the outside, and may determine whether an object moves out of a proximity cancellation distance separated from the at least one light sensor or the electronic device 201 from within the proximity cancellation distance by comparing a sensing value generated by the at least one light sensor based on an amount of light scattered or reflected from the object and a fixed proximity cancellation threshold value.

The communication module 220 may be configured the same as or similar to the communication interface 170 of the electronic device 101 of FIG. 1. For example, the communication module 220 may include a cellular module 221, a Wi-Fi module 223, a Bluetooth module 225, a GNSS module 227, an NFC module 228, and an RF module 229. The cellular module 221 may provide voice communication, video communication, a messaging service, and an Internet service through a communication network. The cellular module 221 may perform discrimination and authentication of the electronic device 201 within a communication network using the SIM card 224. The cellular module 221 may perform at least a portion of functions that the processor 210 provides. According to an embodiment, the cellular module 221 may include a communication processor (CP). According to various embodiments, at least two of the cellular module 221, the Wi-Fi module 223, the Bluetooth module 225, the GNSS module 227 or the NFC module 228 may be included within one integrated chip (IC) or an IC package. The RF module 229 may transmit and receive a communication signal, such as an RF signal. The RF module 229 may include a transceiver, a power amplifier module (PAM), a frequency filter, a low noise amplifier (LNA), or an antenna. According to another embodiment, at least one of the cellular module 221, the Wi-Fi module 223, the Bluetooth module 225, the GNSS module 227, and the NFC module 228 may transmit and receive an RF signal through a separate RF module. The SIM card 224 may include an embedded SIM including a SIM, and may include unique identification information, such as an integrated circuit card identifier (ICCID) or subscriber information, such as an integrated mobile subscriber identity (IMSI).

The memory 230 such as the memory 130 of FIG. 1 may include an internal memory 232 or an external memory 234. The internal memory 232 may include at least one of a volatile memory, such as a dynamic random access memory (DRAM), a static RAM (SRAM), or a synchronous DRAM (SDRAM), and a nonvolatile memory, such as a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, and a solid state drive (SSD). The external memory 234 may include a flash drive, such as a compact flash (CF), secure digital (SD), micro secure digital (Micro-SD), mini secure digital (Mini-SD), extreme digital (xD), multimedia card (MMC), and a memory stick, and may be functionally or physically connected to the electronic device 201 through various interfaces.

The sensor module 240 may measure a physical quantity or may detect an operation state of the electronic device 201, and may convert the measured or detected information to an electric signal. The sensor module 240 may include at least one of a gesture sensor 240A, a gyro sensor 240B, a barometer sensor 240C, a magnetic sensor 240D, an acceleration sensor 240E, a grip sensor 240F, a proximity sensor 240G, a red, green, blue (RGB) sensor 240H (or a color sensor), a biometric sensor 240I, a temperature/humidity sensor 240J, an illumination sensor 240K, or an UV sensor 240M. Additionally or alternatively, the sensor module 240 may include an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor, and a control circuit for controlling at least one sensor included therein. The electronic device 201 may further include a processor which is a part of or separate from the processor 210 and is configured to control the sensor module 240. The processor 210 may control the sensor module 240 while the processor 210 remains at a sleep state.

According to an embodiment, a light sensing device may include at least a part of at least one optical sensor, such as the gesture sensor 240A, the proximity sensor 240G, or the RGB sensor 240H. For example, the light sensing device may use a light emitting unit of the sensor module 240 having at least one light source for outputting light of at least one wavelength band. Also, the light sensing device may include a light receiving unit of the sensor module 240 having at least one region for receiving light of at least one wavelength band.

The input device 250 may include a touch panel 252, a (digital) pen sensor 254, a key 256, or an ultrasonic input device 258. The touch panel 252 may use at least one of a capacitive, resistive, infrared or ultrasonic detecting method. According to some embodiments, the touch panel 252 may further include a control circuit. In some embodiments, the touch panel 2252 may further include a tactile layer to provide a tactile reaction to a user. The (digital) pen sensor 254 may be a part of a touch panel or may include an additional sheet for recognition. The key 256 may include a physical button, an optical key, or a keypad. The ultrasonic input device 258 may detect an ultrasonic wave, which is generated from an input tool, through a microphone 288, and may check data corresponding to the detected ultrasonic wave.

The display 260 may include a panel 262, a hologram device 264, a projector 266, and/or a control circuit for controlling the aforementioned elements. The panel 262 may be implemented to be flexible, transparent, or wearable. The panel 262 and the touch panel 252 may be integrated into one or more modules. The hologram device 264 may display a stereoscopic image in a space using a light interference phenomenon. The projector 266 may project light onto a screen so as to display an image. The screen may be arranged inside or outside the electronic device 201. The interface 270 may include a high definition multimedia interface (HDMI) 272, a USB 274, an optical interface 276, and a D-subminiature (D-sub) 278. The interface 270 may be included in the communication interface 170 illustrated in FIG. 1. Additionally or alternatively, the interface 270 may include a mobile high definition link (MHL) interface, a SD card/multi-media card (MMC) interface, or an Infrared Data Association (IrDA) standard interface.

The audio module 280 may convert a sound and an electric signal in dual directions, and may process sound information that is inputted or outputted through a speaker 282, a receiver 284, an earphone 286, and the microphone 288. The camera module 291 shoots a still image or a video, and may include one or more image sensors, a lens, an image signal processor (ISP), and a flash, such as an LED or a xenon lamp.

The power management module 295 may manage power of the electronic device 201 and may include a power management integrated circuit (PMIC), a charger IC, and a battery gauge. The PMIC may have a wired charging method and/or a wireless charging method including a magnetic resonance, magnetic induction, or electromagnetic wave method. The PMIC may further include an additional circuit for wirelessly charging a coil loop, a resonance circuit, or a rectifier. The battery gauge may measure a remaining capacity of the battery 296, such as a rechargeable battery or a solar battery, and a voltage, current or temperature thereof while the battery 296 is being charged.

The indicator 297 may display a specific state of the electronic device 201 or a portion thereof, such as a booting, message, or charging state. The motor 298 may convert an electrical signal into a mechanical vibration and may generate vibration or a haptic effect. For example, the electronic device 201 may include a mobile TV supporting device, such as a GPU, for processing media data according to the standards of digital multimedia broadcasting (DMB), digital video broadcasting (DVB), or MediaFlo™. Each of the elements described in the present disclosure may be configured with one or more components, and the names of the elements may be changed according to the type of the electronic device. Some elements of the electronic device may be omitted or other additional elements may be added. Furthermore, some of the elements may be combined with each other so as to form one entity, and the functions of the elements may be performed in the same manner as before being combined.

Figure 3:
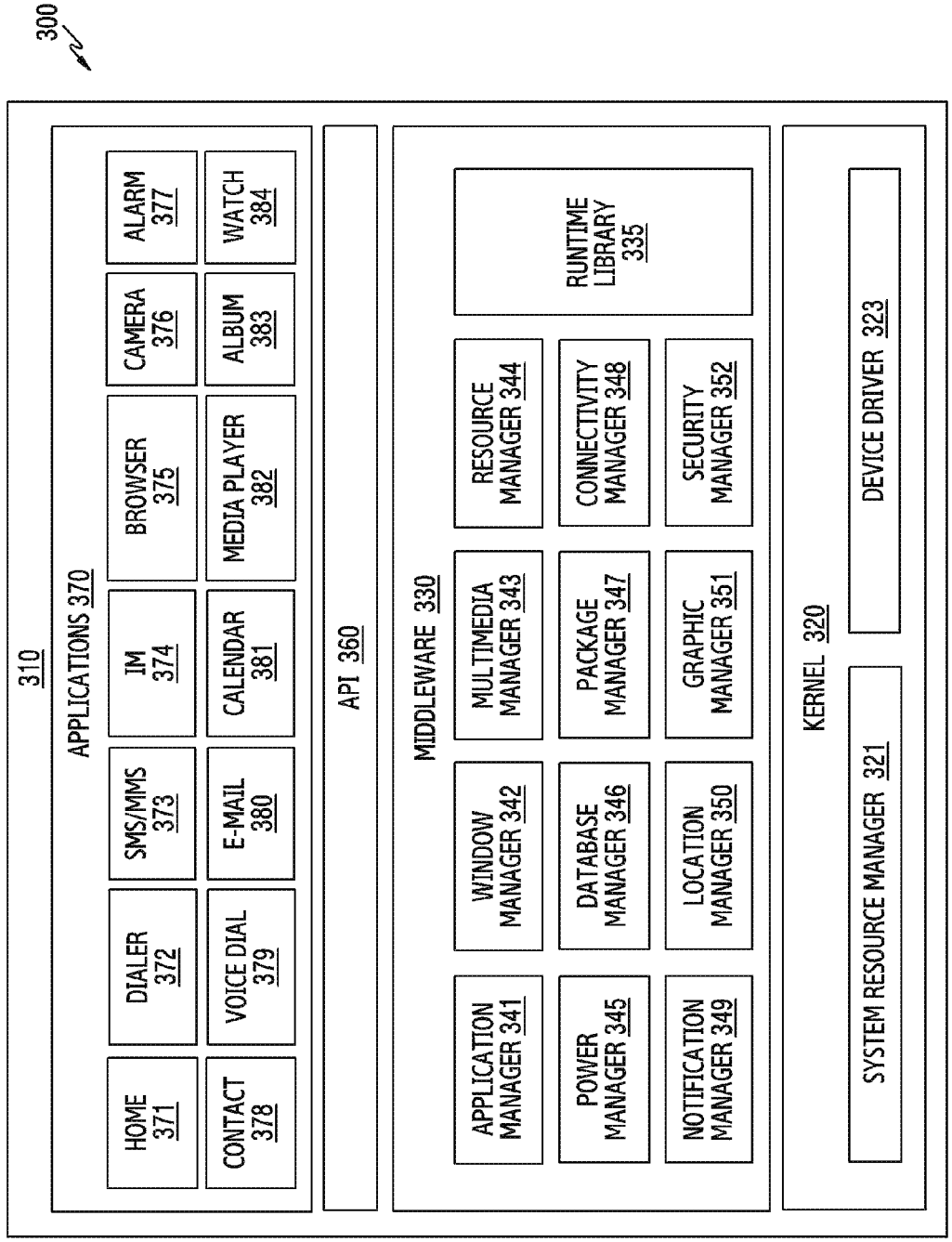
FIG. 3 is a block diagram of a program module according to embodiments of the present disclosure.

FIG. 3 is a block diagram of a program module according to embodiments of the present disclosure. According to an embodiment, a program module 310 may include an OS for controlling resources associated with an electronic and/or various applications driven on the OS. For example, the OS may include Android™, iOS™, Windows™, Symbian™, Tizen™, or Bada™.

Referring to FIG. 3, the program module 310 may include a kernel 320, middleware 330, an API 360, and/or applications 370. At least a portion of the program module 310 may be preloaded on the electronic device or downloaded from an external electronic device.

The kernel 320 may include a system resource manager 321 and/or a device driver 323. The system resource manager 321 may control, allocate or collect the system resources. The system resource manager 321 may include a process manager, a memory manager, or a file system manager. The device driver 323 may include a display driver, a camera driver, a Bluetooth driver, a shared memory driver, a universal serial bus (USB) driver, a keypad driver, a WiFi driver, an audio driver, or an inter-process communication (IPC) driver. The middleware 330 may provide functions which are commonly required by the applications 370 or may provide various functions to the applications 370 through the API 360 such that the applications 370 can use limited system resources in the electronic device.

The middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

For example, the runtime library 335 may include a library module which is used by a compiler to add a new function through a programming language while at least one of the applications 370 is executed, and may perform input/output management, memory management, or an arithmetic function. The application manager 341 may manage a life cycle of the applications 370, for example. The window manager 342 may manage GUI resources used in a screen. The multimedia manager 343 may receive a format necessary for reproducing media files and may encode or decode the media files by using a Codec suited to the corresponding format. The resource manager 344 may manage a source code of the applications 370 or a space of a memory. The power manager 345 may manage a capacity of a battery or a power source and may provide power information necessary for the operation of the electronic device. The power manager 345 operates along with a basic input/output system (BIOS). The database manager 346 may generate, search, or change a database which is used in the applications 370. The package manager 347 may manage installing or updating an application which is distributed in the form of a package file.

The connectivity manager 348 may manage wireless connection. The notification manager 349 may notify the user of an event such as a message arrived, an appointment, or a notification of proximity. The location manager 350 may manage location information of the electronic device. The graphic manager 351 may manage a graphic effect to be provided to the user or a relevant user interface. The security manager 352 may provide system security or user authentication.

The middleware 330 may include a telephony manager to manage a speech or video telephony function of the electronic device, or a middleware module to form a combination of the various functions of the above-described elements. The middleware 330 may provide a module which is customized according to a type of an OS. The middleware 330 may dynamically delete a portion of the existing elements or may add new elements. The API 360 may be a set of API programming functions and may be provided as a different configuration according to an OS. For example, in the case of Android or iOS, a single API set may be provided for each platform. In the case of Tizen, two or more API sets may be provided for each platform.

The applications 370 may include a home 371, a dialer 372, a short message service (SMS)/multimedia messaging service (MMS) 373, an instant message (IM) 374, a browser 375, a camera 376, an alarm 377, contacts 378, a voice dial 379, an email 380, a calendar 381, a media player 382, an album 383, a watch 384, a health care, such as measuring exercise or blood sugar, and an environmental information application, such as information on atmospheric pressure, humidity, or temperature. The applications 370 may further include an information exchanging application for supporting information exchange between the electronic device and an external electronic device such as a notification relay application for relaying specific information to an external electronic device or a device management application for managing an external electronic device. The notification relay application may relay notification information generated in another application of the electronic device to an external electronic device, or may receive notification information from an external electronic device and provide the notification information to the user. The device management application may install, delete, or update a function, such as turn-on/turn-off of an external electronic device or a part thereof, or adjustment of brightness of a display of the external electronic device which communicates with the electronic device, or an application running in the external electronic device.

The applications 370 may further include a health care application of a mobile medical device which is assigned in accordance with an attribute of the external electronic device, and an application which is received from an external electronic device. At least a portion of the program module 310 may be executed by software, firmware, or hardware, or a combination of two or more thereof, and may include modules, programs, routines, sets of instructions, or processes for performing one or more functions.

The term "module" used herein may include a unit including hardware, software, or firmware, and may be interchangeably used with the terms "logic," "logical block," "component" or "circuit". The "module" may be a minimum unit of an integrated component or may be a part thereof. The "module" may be an integrally configured component or a minimum unit for performing one or more functions or a part thereof. The "module" may be implemented mechanically or electronically. For example, the "module" may include an application-specific IC (ASIC) chip, a field-programmable gate array (FPGA), and a programmable-logic device for performing some operations, which are known or will be developed.

At least a portion of a device, such as modules or functions thereof, or a method may be implemented by instructions stored in a computer-readable storage media in the form of a programmable module. When the instruction is executed by a processor, the processor may perform a function corresponding to the instruction. A computer-readable recording media may include a hard disk, a floppy disk, magnetic media, such as a magnetic tape, optical media, such as a compact disc read only memory (CD-ROM) and a digital versatile disc (DVD), a magneto-optical media, such as a floptical disk), and an internal memory. An instruction may include a code generated by a compiler or a code executable by an interpreter. A module or a program module according to embodiments may include at least one of the above-described elements, a portion of the above-described elements may be omitted, or additional elements may be further included. Operations performed by a module, a program module, or other elements according to embodiments may be executed sequentially, in parallel, repeatedly, or in a heuristic method, at least a portion of operations may be executed in different sequences or omitted, and other operations may be added.

Figure 4:
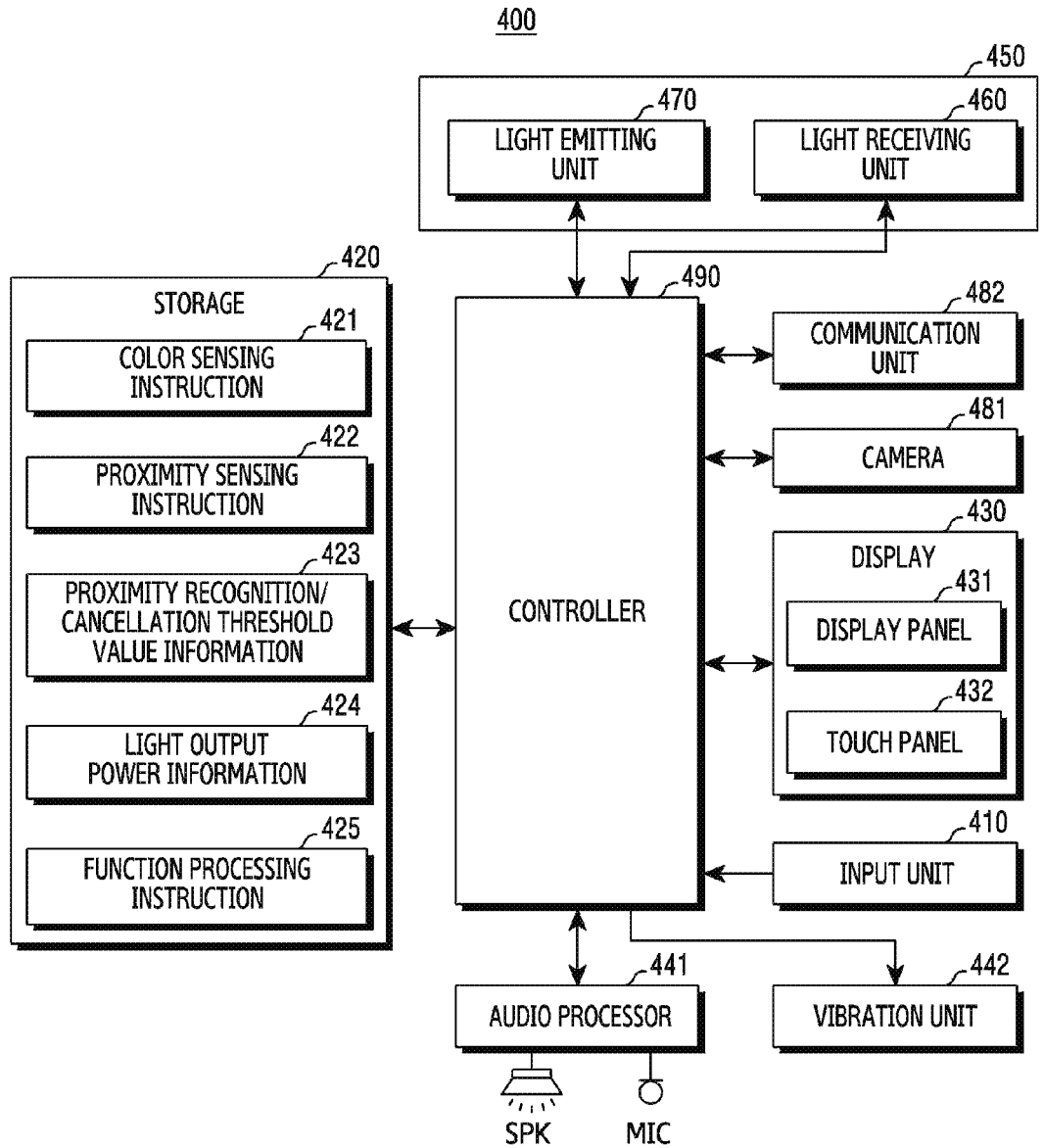
FIG. 4 is a block diagram of an electronic device which provides a proximity sensing function according to an embodiment of the present disclosure.

FIG. 4 is a block diagram of an electronic device which provides a proximity sensing function according to an embodiment of the present disclosure. FIGS. 5A, 5B, 5C and 5D illustrate a light sensing device according to embodiments of the present disclosure. The electronic device 400 may include an entirety or a part of the electronic device 101 of FIG. 1 and the electronic device 201 of FIG. 2.

In FIG. 4, the electronic device 400 may sense a color of an object, and may sense a proximity distance of the object or proximity or remoteness of the object by processing a value sensed by a light sensing device 450, such as a proximity sensor, based on the color of the object. The light sensing device 450 may output light to the outside, receive light scattered or reflected from an object, and generate a digital value according to the received light.

The electronic device 400 may sense the color of the object using various elements installed in the electronic device 400. For example, the electronic device 400 may determine the color of the object based on a value outputted from a spectrum sensor of the light sensing device 450. In another example, the electronic device 400 may determine the color of the object based on image data which is acquired from a camera 481, but not limited to the camera 481, the electronic device 400 may determine the color of the object using other elements.

The electronic device 400 may sense the proximity or remoteness of the object using a proximity recognition threshold value, which is a criterion for determining proximity recognition, based on the color of the object, and/or a proximity cancellation threshold value, which is a criterion for determining proximity cancellation, based on the color of the object.

The light sensing device 450 may output light of a proximity sensing wavelength band, such as a peak sensitivity wavelength of about 940 nanometers (nm) or 950 nm. An object may be located in the proximity of the light sensing device 450, and light emitted from the light sensing device 450 may be scattered or reflected by the object. The light of the proximity sensing wavelength band (or light energy or a light signal) scattered or reflected from the object may enter the light sensing device 450, which may generate a digital value (hereinafter, a sensing value) which is proportional to the amount of light scattered or reflected from the object. A light absorption rate or a light reflection rate may differ according to a color of an object.

The electronic device 400 may adjust the proximity recognition threshold value and/or the proximity cancellation threshold value, based on an amount of light scattered or reflected from the object, according to the color of the object, and may select the proximity recognition threshold value and/or the proximity cancellation threshold value according to the color (or reflection rate) from the object corresponding to the light sensing device 450.

According to an embodiment, an operation flow for determining proximity or remoteness of an object may include determining whether the object moves from out of a proximity recognition distance to within the proximity recognition distance, such as about 10 cm from the light sensing device 450. The electronic device 400 may use a result of comparing the proximity recognition threshold value selected based on the color of the object and the sensing value generated from the light sensing device 450 according to the amount of light scattered or reflected from the object. For example, when the sensing value generated from the light sensing device 450 is greater than or equal to the proximity recognition threshold value selected based on the color of the object, the electronic device 400 may determine that the object moves within the proximity recognition distance and that the proximity is recognized.

Determining the proximity or remoteness of the object may further include determining whether the object moves out of a proximity cancellation distance separated from the light sensing device 450 from within the proximity cancellation distance, which may be designed to be greater than the proximity recognition distance. The electronic device 400 may use a result of comparing the proximity cancellation threshold value selected based on the color of the object and the sensing value generated from the light sensing device 450 according to the amount of light scattered or reflected from the object. For example, when the sensing value generated from the light sensing device 450 is less than the proximity cancellation threshold value selected based on the color of the object, the electronic device 400 may determine that the object moves out of the proximity cancellation distance, and that proximity is cancelled. The proximity cancellation threshold value may be designed to be less than the proximity recognition threshold value.

According to another embodiment, the electronic device 400 may adjust a light output power, current, or voltage of at least one light source of a proximity sensor included in the light sensing device 450 based on the color of the object. For example, when the light source is driven by a substantially uniform light output power, an intensity of light emitted from the light source may be substantially uniform. When the intensity of light outputted from the light source is uniform and a first object having a color of a first light reflection rate is located 10 cm from the light sensing device 450, the light sensing device 450 may generate a first sensing value corresponding to the amount of light reflected from the first object. When the intensity of light outputted from the light source is uniform and a second object having a color of a second light reflection rate higher than the first light reflection rate is located 10 cm from the light sensing device 450, the light sensing device 450 may generate a second sensing value corresponding to the amount of light reflected from the second object. Since the light reflection rate of the second object is higher than the light reflection rate of the first object and the intensity of light emitted from the light source is uniform, the amount of reflected from the second object may be greater than the amount of light reflected from the first object at the same distance from the light sensing device 450.

When a fixed proximity recognition threshold value is used when the intensity of light emitted from the light source is uniform, there may be an error in that a proximity recognition distance to the second object and a proximity recognition distance to the first object are not identical to each other since the amount of light reflected from the second object and the amount of light reflected from the first object are different from each other, as described above.

Even when a fixed proximity cancellation threshold value is used, when the intensity of light emitted from the light source is uniform, there may be an error in that a proximity cancellation distance to the second object and a proximity cancellation distance to the first object are not identical to each other.

According to an embodiment, by using a fixed proximity recognition threshold value and/or a fixed proximity cancellation threshold value in determining proximity or remoteness of an object, the electronic device 400 may adjust a light output power of the light source based on the color of the object (or reflection rate) in order to reduce the occurrence of the above-described error.

For example, when it is determined that the object has the color of the first light reflection rate, the electronic device 400 may select a first light output power value corresponding to the color of the first reflection rate. When it is determined that the object has the color of the second light reflection rate higher than the first light reflection rate, the electronic device 400 may select a second light output power value which is lower than the first light output power value to correspond to the color of the second reflection rate. Since the amount of light reflected from the first object by light of a light intensity according to the first light output power value and the amount of light reflected from the second object by light of a light intensity according to the second light output power value are substantially identical to each other at the same distance from the light sensing device 450, the occurrence of the above-described error can be reduced.

Referring to FIG. 4, the electronic device 400 may include a storage 420, the light sensing device 450, and a controller 490.

The storage 420 such as the memory 230 of FIG. 2 may store various basic operating systems necessary for operating the electronic device 400 and data or applications and algorithms corresponding to various user functions. The controller 490 such as the processor 120 of FIG. 1 or the processor 210 of FIG. 2 may perform various operations of the electronic device 400 using instructions or information included in the storage 420.

The storage 420 may include a color sensing instruction 421, a proximity sensing instruction 422, proximity recognition/cancellation threshold value information 423, light output power information 424, and a function processing instruction 425.

The color sensing instruction 421 may sense color data regarding a color of an object located around the electronic device 400. The color sensing instruction 412 may include an activation routine for selecting and activating at least one element used for acquiring the color data. For example, the at least one element for acquiring the color data may be a spectrum sensor of the light sensing device 450 or the camera 481. The color sensing instruction 421 may include a collection routine for collecting the color data acquired by the activated element, and a determination routine for determining the color of the object based on the collected color data.

The proximity sensing instruction 422 may determine the proximity or remoteness of the object using at least a part of the light sensing device 450. The proximity sensing instruction 422 may include an activation routine for selecting and activating at least a part used for acquiring a value related to the proximity of the object in the light sensing device 450. The proximity sensing instruction 422 may include a selection routine for selecting, from the proximity recognition/cancellation threshold value information 423, a proximity recognition threshold value which is a criterion for determining proximity recognition based on the color of the object. The proximity sensing instruction 422 may include, a selection routine for selecting, from the proximity recognition/cancellation threshold value information 423, a proximity cancellation threshold value which is a criterion for determining proximity cancellation based on the color of the object. The proximity sensing instruction 422 may include an acquisition routine for acquiring a sensing value generated from the light sensing device 450.

The proximity sensing instruction 422 may include a proximity recognition routine for determining when the object moves within a proximity recognition distance of about 10 cm from the light sensing device 450 from out of the proximity recognition distance by comparing a sensing value generated from the light sensing device 450 regarding the object and a proximity recognition threshold value selected regarding the object. For example, when the sensing value generated from the light sensing device 450 is greater than or equal to the proximity recognition threshold value selected based on the color of the object, the controller 490 may determine that the object has moved within the proximity recognition distance and the proximity is recognized.

For example, when the first object having the color of the first light reflection rate is located at the distance of 10 cm from the light sensing device 450, the light sensing device 450 may generate the first sensing value corresponding to the amount of light reflected from the first object. When the second object having the color of the second light reflection rate higher than the first light reflection rate is located at the same 10 cm distance from the light sensing device 450, the light sensing device 450 may generate the second sensing value corresponding to the amount of light reflected from the second object. Since the light reflection rate of the second object is higher than the light reflection rate of the first object, the amount of light reflected from the second object may be greater than the amount of light reflected from the first object at the same distance from the light sensing device 450, and accordingly, the second sensing value may be greater than the first sensing value.

Since the second sensing value regarding the second object is greater than the first sensing value regarding the first object at the same distance from the light sensing device 450, but the proximity recognition threshold value regarding the second object and the proximity recognition threshold value regarding the first object are set to be different from each other, a proximity recognition distance to the second object and a proximity recognition distance to the first object may be substantially uniform.

The proximity sensing instruction 422 may include a proximity cancellation routine for determining whether the object moves out of a proximity cancellation distance separated from the light sensing device 450 from within the proximity cancellation distance by comparing a sensing value generated from the light sensing device 450 regarding the object and a proximity cancellation threshold value selected regarding the object. The proximity cancellation distance may be designed to be greater than the proximity recognition distance. For example, when the sensing value generated from the light sensing device 450 is less than the proximity cancellation threshold value selected based on the color of the object, the controller 490 may determine that the object has moved out of the proximity cancellation distance.

For example, when the first object having the color of the first light reflection rate is located at the distance of 10 cm from the light sensing device 450, the light sensing device 450 may generate the first sensing value corresponding to the amount of light reflected from the first object. When the second object having the color of the second light reflection rate higher than the first light reflection rate is located at the same 10 cm distance from the light sensing device 450, the light sensing device 450 may generate the second sensing value corresponding to the amount of light reflected from the second object. Since the second sensing value regarding the second object is greater than the first sensing value regarding the first object at the same distance from the light sensing device 450, but the proximity cancellation threshold value regarding the second object and the proximity cancellation threshold value regarding the first object are set to be different from each other, a proximity cancellation distance to the second object and a proximity cancellation distance to the first object may be substantially uniform.

The proximity recognition/cancellation threshold value information 423 may store proximity recognition threshold values and proximity cancellation threshold values according to colors (or color codes) of objects. According to an embodiment, Table 1 presented below illustrates reflection rates, proximity recognition threshold values, and proximity cancellation threshold values according to colors (or color codes) of objects regarding light of a proximity sensing wavelength band from at least one proximity sensing light source included in the light sensing device 450. The proximity recognition/cancellation threshold value information 423 may be based on Table 1. The proximity sensing wavelength band may be a wavelength band including a peak sensitivity wavelength of about 940 nm or 950 nm. As shown in Table 1, the proximity recognition threshold value for each color code may be designed with reference to a proximity recognition distance of 80 mm, and the proximity cancellation threshold value for each color code may be set with reference to a proximity cancellation distance of 100 mm. Table 1 appears as follows:

TABLE 1

| Color | Color code | Reflection rate | Proximity recognition threshold value | Proximity cancellation threshold value | Proximity recognition distance (mm) | Proximity cancellation distance (mm) |
|---|---|---|---|---|---|---|
| White | 0 | 90.27 | 360 | 240 | 80 | 100 |
| Light brown | 1 | 76.18 | 330 | 210 | 80 | 100 |
| Red brown | 2 | 74.48 | 300 | 180 | 80 | 100 |
| Brown | 3 | 21.7 | 270 | 150 | 80 | 100 |
| Apricot | 4 | 76.49 | 240 | 210 | 80 | 100 |
| Gray | 5 | 15.18 | 150 | 120 | 80 | 100 |
| Black | 6 | 6.72 | 100 | 70 | 80 | 100 |

The proximity sensing light outputted from a light emitting unit 470 of the light sensing device 450 may be scattered or reflected from an object. A light receiving unit 460 may receive the light (or light energy or a light signal) scattered or reflected from the object and generate an electric signal associated with a proximity distance of the object. The light sensing device 450 may include an analog-to-digital converter (ADC) that may generate a sensing value (or a digital value), such as an ADC value corresponding to the amount of light received by the light receiving unit 460, such as quantization. For example, as a distance between the light sensing device 450 and the object decreases, the amount of light scattered or reflected from the object and entering the light receiving unit 460 may increase and the ADC value may increase. As the distance between the light sensing device 450 and the object increases, the amount of light reflected and entering the light receiving unit 460 may decrease and the ADC value may decrease. The proximity recognition threshold values and the proximity cancellation threshold values disclosed in Table 1 may be digital numbers of the same dimension as that of the ADC value.

In an embodiment, according to the proximity recognition routine of the proximity sensing instruction 422, the controller 490 may determine whether the object moves within the proximity recognition distance, such as about 80 millimeters (mm) from the light sensing device 450, from out of the proximity recognition distance by comparing a sensing value generated from the light sensing device 450 regarding the object and a proximity recognition threshold value selected regarding the object. For example, referring to Table 1, when the black object is located around the light sensing device 450, the controller 490 may determine that the color of the object is "black" or the color coder of the object is "6" based on the color sensing instruction 421. The controller 490 may select a proximity recognition threshold value "100" corresponding to the color code "6" based on the proximity sensing instruction 422. When the ADC value generated from the light sensing device 450 is greater than or equal to the proximity recognition threshold value "100," the controller 490 may determine that the black object has moved within the proximity recognition distance of 80 mm.

Based on the proximity cancellation routine of the proximity sensing instruction 422, the controller 490 may determine whether the object moves out of the proximity cancellation distance, such as about 100 mm from the light sensing device 450, from within the proximity cancellation distance by comparing a sensing value generated from the light sensing device 450 regarding the object and a proximity cancellation threshold value selected regarding the object. For example, referring to Table 1, when the black object is located around the light sensing device 450, the controller 490 may determine that the color code of the object is "6" based on the color sensing instruction 421, and may select a proximity cancellation threshold value "70" corresponding to the color code "6" based on the proximity sensing instruction 422. When the ADC value generated from the light sensing device 450 is less than the proximity cancellation threshold value "70," the controller 490 may determine that the black object has moved out of the proximity cancellation distance of about 100 mm.

The electronic device 400 may be designed to use a fixed proximity recognition threshold value and a fixed proximity cancellation threshold value. The proximity sensing instruction 422 may include a power adjustment routine for adjusting a light output power of at least one proximity sensing light source included in the light sensing device 450 based on the color of the object, and may include a selection routine for selecting, from the light output power information 424, a light output power value of the at least one proximity sensing light source based on the color of the object.

For example, when it is determined that the object has the color of the first light reflection rate, the controller 490 may select the first light output power value corresponding to the color of the first reflection rate, and drive the at least one proximity sensing light source included in the light sensing device 450 according to the selected first light output power value. When it is determined that the object has the color of the second light reflection rate higher than the first light reflection rate, the controller 490 may select the second light output power value lower than the first light output power value to correspond to the color of the second reflection rate, and may drive the at least one proximity sensing light source included in the light sensing device 450 according to the selected second light output power value.

The amount of light reflected from the first object by the light of the light intensity according to the first light output power value and the amount of light reflected from the second object by the light of the light intensity according to the second light output power value may be substantially identical to each other at the same distance from the light sensing device 450. Since a sensing value generated from the light sensing device 450 based on the amount of light reflected from the first object and a sensing value generated from the light sensing device 450 based on the amount of light reflected from the second object are substantially identical to each other at the same distance from the light sensing device 450, a proximity recognition distance to the first object and a proximity recognition distance to the second object may be substantially uniform. Likewise, a proximity cancellation distance to the first object and a proximity cancellation distance to the second object may be substantially uniform at the same distance from the light sensing device 450. Since the light output power of the at least one proximity sensing light source included in the light sensing device 450 is adjusted, power may be efficiently used.

The light output power information 424 may include a light output power value according to a color or a color code. The light output power value may be a numerical value related to a voltage or a current.

As described above, the proximity sensing instruction 422 may include a first setting for driving the light source according to a fixed light output power value, and selecting a proximity recognition threshold value and a proximity cancellation threshold value according to a color of an object. The proximity sensing instruction 422 may include a second setting for selecting a light output power value of the light source according to a color of an object, and using a fixed proximity recognition threshold value and a fixed proximity cancellation threshold value. The controller 490 may selectively use one of the first setting and the second setting. For example, the controller 490 may select one of the first setting and the second setting based on a user input. In another example, the controller 490, may select one of the first setting and the second setting according to an executed application, such as a telephony application, a biometric application (for example, an application for recognizing a degree of skin moisture, skin melanin, or the like). The proximity sensing instruction 422 may include a routine that applies both the setting for adjusting the light output power value of the light source based on the color of the object, and for adjusting the proximity recognition threshold value and the proximity cancellation threshold value.

The function processing instruction 425 may include a proximity recognition processing routine for processing various functions of the electronic device 400 based on proximity recognition of the object. The function processing instruction 425 may include a proximity cancellation processing routine for processing various functions of the electronic device 400 based on proximity cancellation of the object. For example, the controller 490 may deactivate the display 430 based on the proximity recognition, and may activate the display 430 based on the proximity cancellation.

The light sensing device 450 may include the light receiving unit 460 and the light emitting unit 470. The light receiving unit 460 may include one or more light detectors (or sensors) for detecting light signals of one or more wavelength bands.

The light receiving unit 460 may include a plurality of light detectors that may detect light signals of at least one different wavelength band. For example, one light detector may detect a light signal of a first wavelength band and another light detector may detect a light signal of a second wavelength band which is different from the first wavelength band.

The light receiving unit 460 may include a plurality of light detectors that may detect light signals of at least one similar or same wavelength band. For example, one light detector may detect a light signal of a first wavelength band. Another light detector may detect a light signal of a second wavelength band which is different from the first wavelength band as well as the light signal of the first wavelength band.

The light receiving unit 460 may include one or more optical filters. At least one light detector may be disposed between the optical filter and a printed circuit board (PCB). The optical filter may be an element which selectively enables light of a predetermined wavelength band to penetrate therethrough and/or blocks penetration of light. The light detector may be designed to include the optical filter.

For example, the light detector may be designed to detect a light signal of one wavelength band, and an optical filter for enabling only the light of one wavelength band to penetrate may be applied to the light detector. In another example, the light detector may be designed to detect light signals of at least two wavelength bands and an optical filter for enabling only the light of the at least two wavelength bands to penetrate may be applied to the light detector.

The light receiving unit 460 may sense a light signal of a proximity sensing wavelength band. For example, in a proximity sensing mode, an object, such as a user's face, may be located around the light sensing device 450 and light of a proximity sensing wavelength band, such as a peak sensitivity wavelength of about 940 nm or 950 nm, emitted from the light emitting unit 470 may be scattered or reflected by the object. The scattered or reflected light or light energy or light signal of the proximity sensing wavelength band may enter the light receiving unit 460, and the light receiving unit 460 may generate an electric signal regarding the proximity or remoteness of the object or a proximity distance of the object from the received light.

The light receiving unit 460 may sense a light signal of a gesture sensing wavelength band, such as about 940 nm. For example, in a gesture sensing mode, a user's hand may be located around the light sensing device 450 and light of a gesture sensing wavelength band of about 940 nm emitted from the light emitting unit 470 may be scattered or reflected by the user's hand. The scattered or reflected light of the gesture sensing wavelength band may enter the light receiving unit 460, which may generate an electric signal regarding a gesture of the user's hand from the received light.

The light receiving unit 460 may sense a light signal of an object analyzing wavelength band. For example, in a color sensing mode, an object may be located around the light sensing device 450 and light of a color sensing wavelength band emitted from the light emitting unit 470 may be scattered or reflected by the object. The scattered or reflected light of the color sensing wavelength band may enter the light receiving unit 460, and the light receiving unit 460 may generate an electric signal regarding the color of the object from the received light. In another example, in a biometric mode, a user's body may be located around the light sensing device 450 and light of a biometric wavelength band emitted from the light emitting unit 470 may be scattered or reflected by the user's body. The scattered or reflected light of the biometric wavelength band may enter the light receiving unit 460, and the light receiving unit 460 may generate an electric signal regarding a biometric state of the user's body, such as a degree of skin moisture, melanin, or temperature, heat rate, or blood speed from the received light.

The light receiving unit 460 may sense a light signal of an external environment measuring wavelength band. For example, in an illuminance sensing mode, the light receiving unit 460 may sense external light and convert the external light into an electric signal regarding illuminance.

The light receiving unit 460 may be designed to sense the light signal of the color sensing wavelength band as well as the light signal of the proximity (or gesture) sensing wavelength band.

The light receiving unit 460 may be a light emitting element disposed under the display 430. For example, referring to FIGS. 8A and 8B, the light receiving unit 460 may be disposed on a lower portion of a display 811 in a direction from a first cover 810-1 of the housing 810 to a second cover 810-2. For example, light such as infrared rays outputted from the light emitting unit 470 may be scattered or reflected by an object disposed around the electronic device 400 and may enter the light receiving unit 460 through a screen.

The display 430 may include an organic light emitting diode (OLED) and a thin film transistor (TFT). The light receiving unit 460 may be disposed in the proximity of the TFT. The light receiving unit 460 may be disposed under a substrate on which the TFT is disposed in the direction from the first cover 810-1 to the second cover 810-2.

The light receiving unit 460 may be included in at least a part of the display 430. For example, the light emitting unit 460 may be disposed in an in-cell region or an on-cell region of a display panel 431 of the display 430.

The controller 490 may select a sensing mode based on various trigger types, such as a specific user input, execution of a specific application, or an input from an external device generated from the electronic device 400. The electronic device 400 may provide various sensing modes, such as a proximity, color, gesture, biometric, and illuminance sensing mode. The sensing modes may include various subordinate sensing modes.

The controller 490 may select various multi-sensing modes. For example, the multi-sensing modes may include selection of the proximity sensing mode and the color sensing mode. The multi-sensing modes may include selection of a plurality of subordinate sensing modes in the sensing modes.

In response to one sensing mode being selected, the controller 490 may select at least one other sensing mode associated with the selected one sensing mode. For example, when the proximity sensing mode is selected, the controller 490 may further select the color sensing mode.

The controller 490 may simultaneously perform a plurality of sensing modes of the selected multi-sensing mode, such as when the plurality of sensing modes of the selected multi-sensing mode are independent from one another.

The controller 490 may designate a priority to perform to each of the plurality of sensing modes of the multi-sensing mode. For example, the selected multi-sensing mode may include a first sensing mode and a second sensing mode. When the second sensing mode is designed to be performed based on at least a part of a sensing value acquired through the first sensing mode, the controller 490 may perform the first sensing mode prior to the second sensing mode. When the proximity sensing mode and the color sensing mode are selected, the controller 490 may perform the color sensing mode prior to the proximity sensing mode.

For example, based on the proximity sensing instruction 422 of the routine for selecting a proximity recognition threshold value and a proximity cancellation threshold value according to a color of an object, the controller 490 may determine the color of the object using at least a part of the light sensing device 450 in the color sensing mode, and then perform the proximity sensing mode. In the proximity sensing mode, the controller 490 may select a proximity recognition threshold value and a proximity cancellation threshold value based on the color of the object which is determined in the color sensing mode, and may determine proximity or remoteness of the object by comparing a sensing value generated from the light sensing device 450 and the selected proximity recognition threshold value or proximity cancellation threshold value.

In another example, based on the proximity sensing instruction 422 of the routine for selecting a light output power value of the light source according to the color of the object, the controller 490 may determine the color of the object using at least a part of the light sensing device 450 in the color sensing mode, and then perform the proximity sensing mode. In the proximity sensing mode, the controller 490 may select a light output power value of the proximity sensing light source based on the color of the object determined in the color sensing mode, and may determine the proximity or remoteness of the object by comparing a sensing value generated from the light sensing device 450 and a fixed proximity recognition threshold value or a fixed proximity cancellation threshold value.

The controller 490 may select and activate at least a part of the light receiving unit 460 according to the selected sensing mode. For example, in the proximity sensing mode, the controller 490 may select and activate at least one light detector for sensing proximity from among the plurality of light detectors of the light receiving unit 460, and in the color sensing mode, the controller 490 may select and activate at least one light detector for sensing a gesture from among the plurality of light detectors of the light receiving unit 460.

The light emitting unit 470 may include at least one light emitter (or light source) for generating light of one or more wavelength bands.

The light emitting unit 470 may include a light emitter for generating light of all wavelength bands enabling the light receiving unit 460 to sense light signals. For example, the light emitting unit 470 may be designed as a single light emitter, such as a light emitting element for generating light of a broad wavelength band.

The light emitting unit 470 may be designed to selectively generate light of a corresponding wavelength band under the control of the controller 490. For example, in the proximity sensing mode, the controller 490 may control the light emitting unit 470 to generate light of a proximity sensing wavelength band. In the color sensing mode, the controller 490 may control the light emitting unit 470 to generate light of a color sensing wavelength band.

The light emitting unit 470 may include a plurality of light emitters that may generate light of at least one different wavelength band. For example, one light emitter may generate light of a first wavelength band and another light emitter may generate light of a second wavelength band which is different from the first wavelength band. In the proximity sensing mode, the controller 490 may select and activate at least one light emitter for generating light of a proximity sensing wavelength band from among the plurality of light emitters of the light emitting unit 470. In the color sensing mode, the controller 490 may select and activate at least one light emitter for generating light of a color sensing wavelength band from among the plurality of light emitters of the light emitting unit 470. In the biometric mode, the controller 490 may select and activate at least one light emitter for generating light of a biometric wavelength band from among the plurality of light emitters of the light emitting unit 470.

The light emitting unit 470 may include various types of light emitting elements, such as a light emitting diode (LED).

According to some embodiments, the light emitting unit 470 may be included in at least a part of the display 430. For example, the light emitting unit 470 include a light emitting element of at least a part of the display 430. According to an embodiment, the light emitting element used as the light emitting unit 470 may be disposed in an in-cell region or an on-cell region of the display panel 431 of the display 430.

The light emitting unit 470 may be at least one light emitting element which is disposed under the display 430. For example, referring to FIGS. 8A and 8B, the light emitting unit 470 may be disposed on the lower portion of the display 811 in the direction from the first cover 810-1 of the housing 810 to the second cover 810-2. For example, light (infrared rays) outputted from the light outputting unit 470 may be discharged to the outside through the screen.

The display 430 may include an organic LED (OLED) and a thin film transistor (TFT). The light emitting unit 470 may be disposed in the proximity of the TFT or under a substrate on which the TFT is disposed in the direction from the first cover 810-1 to the 10 second cover 810-2.

Figure 5A:
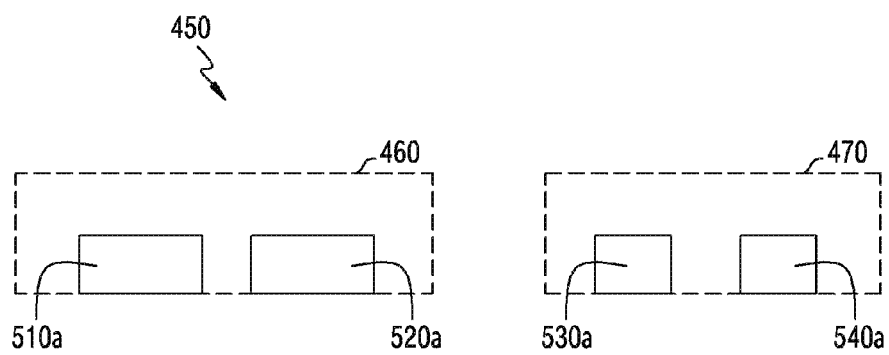
FIGS. 5A, 5B, 5C and 5D illustrate a light sensing device according to embodiments of the present disclosure.
Figure 5B:
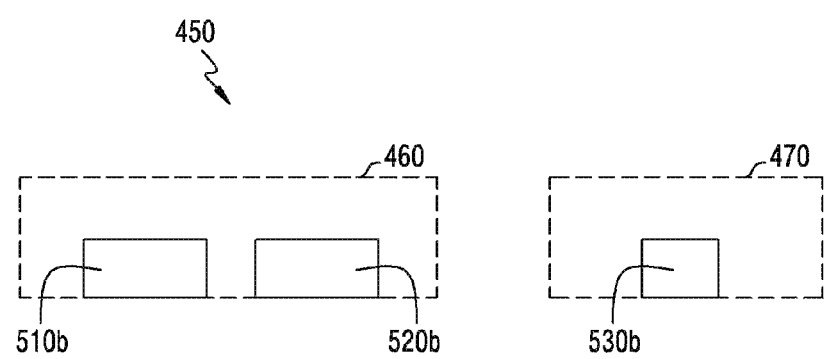

FIGS. 5A and 5B illustrate a light sensing device according to embodiments of the present disclosure. The light emitting unit 470 may output a light of a proximity sensing wavelength band and a light of a color sensing wavelength band. As the lights from the light emitting unit 470 are scattered or reflected from an object, and the light receiving unit 460 of the light sensing device 450 may receive the light of the proximity sensing wavelength band and the light of the color sensing wavelength band.

The light receiving unit 460 of the light sensing device 450 of FIG. 5A may include one or more first light receivers (or first light receiving regions) 510a for receiving the light of the proximity sensing wavelength band, and one or more second light receivers (or second light receiving regions) 520a for receiving the light of the color sensing wavelength band. The first light receiver 510a and the second light receiver 520a may be separated from each other. The first light receiver 510a may be a part of a first sensor, such as a proximity sensor, and the second light receiver 520a may be a part of a second sensor, such as a color or spectrum sensor, which is different from the first sensor. According to another embodiment, the first light receiver 510a or the second light receiver 520a may be a part of a third sensor, such as a biometric sensor, which is different from the first and second sensors.

The light emitting unit 470 of the light sensing device 450 of FIG. 5A may include a first light source (or a first light emitting region) 530a which is able to output light of one or more wavelength bands including the proximity sensing wavelength band, and a second light source (or a second light emitting region) 540a which is able to output light of one or more wavelength bands including the color sensing wavelength band. The first light source 530a may be a part of a first sensor and the second light source 540a may be a part of a second sensor which is different from the first sensor. According to another embodiment, the first light source 530a or the second light source 540a may be a part of a third sensor which is different from the first and second sensors. The first light source 530a or the second light source 540a may be various light emitting elements installed in the electronic device 400. For example, the first light source 530a or the second light source 540a may include a light emitting element of the display.

The light receiving unit 460 of the light sensing device 450 of FIG. 5B may be designed to be at least partly identical to the light receiving unit 460 of FIG. 5A. According to various embodiments, a first light receiver 510b may be at least partly identical to the first light receiver 510a of FIG. 5A, and a second light receiver 520b may be at least partly identical to the second light receiver 520a of FIG. 5A.

The light emitting unit 470 of the light sensing device 450 of FIG. 5B may include a light source (or a light emitting region) 530b which is able to output both the light of the proximity sensing wavelength band and the light of the color sensing wavelength band. The light source 530b may also output light of various other wavelength bands for various sensing modes as well as the light of the proximity sensing wavelength band and the color sensing wavelength band. For example, the light source 530b may be a single light emitting element for generating light of a broad wavelength band. According to an embodiment, the light source 530b may be a part of a first sensor, such as a proximity sensor, in which the first light receiver 510b is installed, or may be a part of a second sensor, such as a color sensor, in which the second light receiver 520b is installed. According to some embodiments, the light source 530b may be a part of a single sensor in which both the first light receiver 510b and the second light receiver 520b are installed. According to another embodiment, the light source 530b may be various light emitting elements of the display panel 431 installed in the electronic device 400.

Figure 5C:
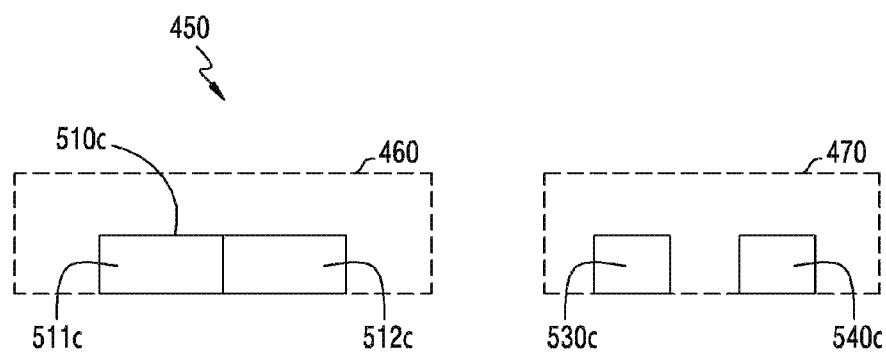

The light receiving unit 460 of the light sensing device 450 of FIG. 5C may include one or more first light receiving regions 511c for receiving the light of the proximity sensing wavelength band, and one or more second light receiving regions 512c for receiving the light of the color sensing wavelength band. According to an embodiment, the first light receiving region 511c and the second light receiving region 512c may be a part 510c of a single sensor. For example, the first light receiving region 511c and the second light receiving region 512c may be a part of a proximity sensor. In another example, the first light receiving region 511c and the second light receiving region 512c may be a part of a color sensor, such as a RGB sensor. In still another example, the first light receiving region 511c and the second light receiving region 512c may be a part of a light sensor which is different from the proximity sensor the color sensor.

The light emitting unit 470 of the light sensing device 450 of FIG. 5C may be designed to be equal to the light emitting unit 470 of FIG. 5A at least in part. According to various embodiments, a first light emitter 530c may be at least partly identical to the first light emitter 530a of FIG. 5A, and a second light emitter 540c may be at least partly identical to the second light emitter 540a of FIG. 5A.

Figure 5D:
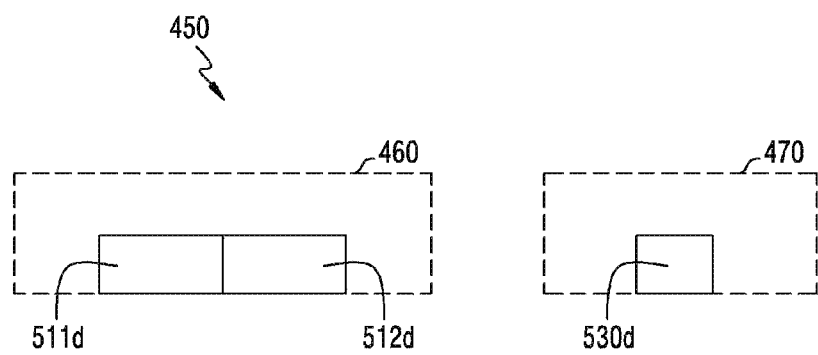

The light receiving unit 460 of the light sensing device 450 of FIG. 5D may be designed to be at least partly identical to the light receiving unit 460 of FIG. 5C. According to various embodiments, a first light receiving region 511d may be at least partly identical to the first light receiving region 511c of FIG. 5C and a second light receiving region 512d may be at least partly identical to the second light receiving region 512c of FIG. 5C.

The light emitting unit 470 of the light sensing device 450 of FIG. 5D may be designed to be at least partly identical to the light emitting unit 470 of FIG. 5B. According to various embodiments, a light source 530d may be similar to or same as to the light source 530c of FIG. 5C.

The controller 490, such as the processor 120 of FIG. 1 or the processor 210 of FIG. 2 may be configured to control various signal flows for supporting a light sensing function according to an embodiment, and control collection and output of information. The controller 490 may include the elements illustrated in FIG. 6, described below.

The controller 490 may select at least one sensing mode based on the instructions 421, 422, and 425 and may set the light sensing device 450 according to the selected at least one sensing mode. The controller 490 may acquire a sensing value which is generated through the light sensing device 450 in the sensing mode selected based on the instructions 421, 422, 425, and may process a corresponding function.

The electronic device 400 may further include an input unit 410, such as the input device 250 of FIG. 2, configured to generate various input signals necessary for operating the electronic device 400. The input unit 410 may include various inputting means such as a keyboard, a keypad, a key button, or a touch button according to whether the electronic device 400 is compatible. The input unit 410 may cause various types of user inputs for executing the instructions 421, 422, and 423.

The electronic device 400 may further include the display 430 designed to provide various screen interfaces necessary for operating the electronic device 400. The display 430 may include a touch screen having the display panel 431 such as the display 260 of FIG. 2 and a touch panel 432 such as the touch panel 252 of FIG. 2 overlapping each other. The display panel 431 may display various screens such as an image and a text based on the instructions 421, 422, and 425. For example, the touch panel 432 may be designed to receive various touch inputs on the screen displayed through the display panel 431 based on the instructions 421, 422, and 425.

A light emitting region (or a light emitting element) of at least a part of the display 430 may be included in the light emitting unit 470 of the light sensing device 450. For example, the light emitting unit 470 may be disposed in an in-cell region or an on-cell region of the display panel 431.

The electronic device 400 may further include the camera 481 designed to activate a camera function in various modes under the control of the controller 490. The camera 481 may be used in the color sensing mode based on the color sensing instruction 421. For example, the controller 490 may activate the camera 481 in the color sensing mode and may capture image data on an object from the camera 481. The controller 490 may determine a color or a color code of the object based on the image data captured by the camera 481.

The electronic device 400 may further include a communication unit 482, such as the communication module 229 of FIG. 2, configured to support a communication function of the electronic device 400 and provided in the form of a mobile communication module to support the communication function of the electronic device 400.

The communication unit 482 may support signal transmission and reception for performing the mobile communication function of the electronic device 400 by forming a communication channel with a mobile communication system. For example, the communication unit 482 may form at least one of a voice service channel, a video service channel or a data service channel with the mobile communication system, and may support transmission and reception of a specific signal according to the corresponding service channel. The communication unit 482 may operate in relation to the sensing function under the control of the controller 490 based on the function processing instruction 425. For example, sensed biometric information may be designed to be transmitted to an external device through the communication unit 482.

The electronic device 400 may further include an audio processor 441, a vibration unit 442, the camera 481, and the communication unit 482. The audio processor 441 such as the audio module 280 of FIG. 2 may output various audio data regarding the operation of the electronic device 400 and audio data received from the outside through a speaker (SPK). The audio processor 441 may output various sound effects or guidance voices related to the light sensing function under the control of the controller 490. The various sound effects or guidance voices related to the light sensing function may be changed according to user environment setting.

The audio processor 441 may include an audio decoder and a digital-to-analog (D/A) converter. The audio decoder may convert audio data stored in the storage 420 into a digital audio signal. The D/A converter may convert the digital audio signal converted by the audio decoder into an analog audio signal.

The audio processor 441 may receive a voice through a microphone (MIC). For example, the audio processor 441 may include an analog-to-digital (A/D) converter that may convert an analog voice signal transmitted through the MIC into a digital voice signal. The audio processor 441 may receive various audio inputs related to the light sensing function under the control of the controller 490. For example, the audio processor 441 may sense a voice input related to selection of the biometric mode through the MIC, and may transmit the sensed voice input to the controller 490.

The vibration unit 442 may include at least one vibrator disposed in at least one location of the electronic device 400, may activate the vibrator in various vibration patterns based on various types of trigger generated from the electronic device 400 and received from the outside under the control of the controller 490. The vibration unit 442 may cause a vibration related to the light sensing function under the control of the controller 490 based on the function processing instruction 425. For example, when the proximity sensing mode and the biometric mode are selected and a proximity distance sensed through the proximity sensing mode is less than or equal to a reference distance, the vibration unit 442 may cause a vibration for informing start of the biometric mode under the control of the controller 490.

The electronic device 400 may further include various elements which have not been mentioned in the above description, such as a short range communication module for short range communication, an interface for transmitting and receiving data in a wired or wireless communication method of the electronic device 400, an Internet communication module for performing an Internet function by communicating with an internet network, and a digital broadcasting module for performing functions of receiving and reproducing a digital broadcast. Forms of these elements may be changed according to the trend of convergence of digital devices and all of the elements are not listed, but elements having the same level as the above-mentioned elements may further be included in the device. Specific elements from among the above-described elements may be excluded or may be substituted with other elements in the electronic device 400 according to the design of the electronic device, as will be easily understood by a person of ordinary skill in the art.

Figure 6:
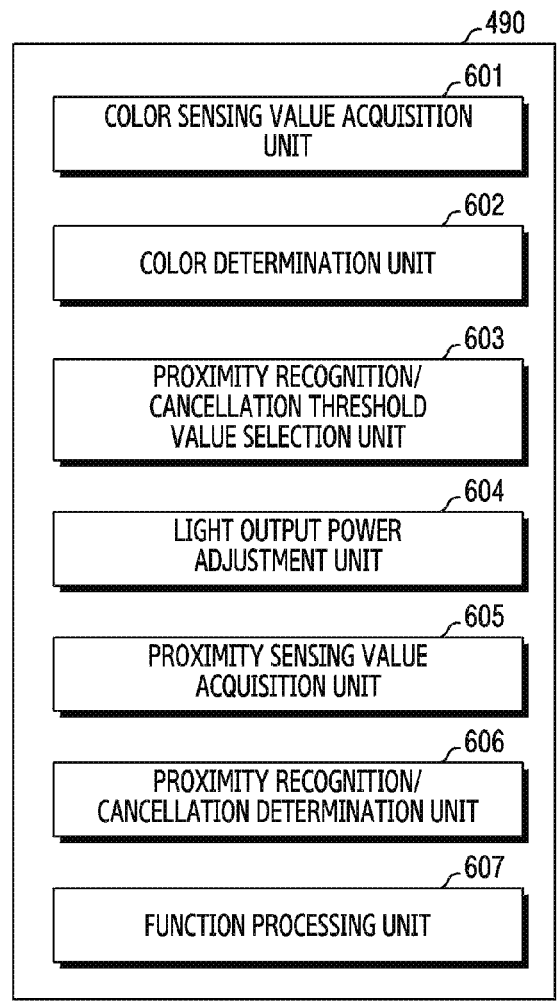
FIG. 6 illustrates a controller according to an embodiment of the present disclosure.
Figure 7:
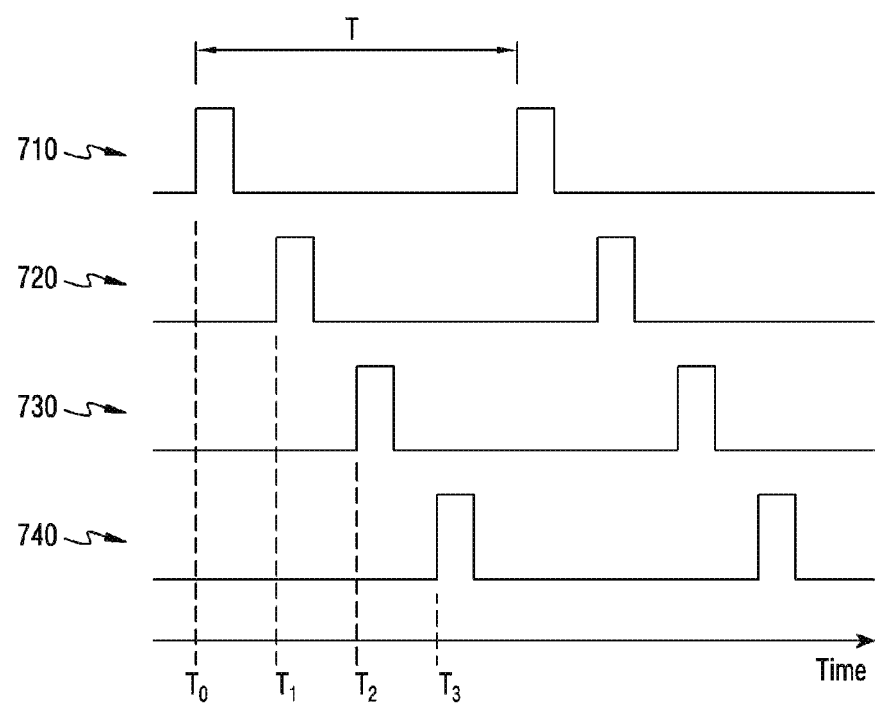
FIG. 7 illustrates an operation sequence of the controller according to an embodiment of the present disclosure.

FIG. 6 illustrates the controller 490 according to an embodiment of the present disclosure. FIG. 7 illustrates an operation sequence of the controller 490 according to an embodiment of the present disclosure.

Referring to FIG. 6, the controller 490 may include a color sensing value acquisition unit 601, a color determination unit 602, a proximity recognition/cancellation threshold value selection unit 603, a light output power adjustment unit 604, a proximity sensing value acquisition unit 605, a proximity recognition/cancellation determination unit 606, and a function processing unit 607.

The color sensing value acquisition unit 601 may acquire or collect color data as a color sensing value regarding an object which is located around an electronic device using various elements in the color sensing mode according to the color sensing instruction 421. According an embodiment, the color sensing value acquisition unit 601 may acquire the color sensing value through at least a part such as a spectrum sensor of the light sensing device 450 or the camera 481.

The color determination unit 602 may receive the color sensing value from the color sensing value acquisition unit 601. According to the color sensing instruction 421 of the storage 420, the color determination unit 602 may determine the color or color code from the color sensing value based on the color sensing mode.

The proximity recognition/cancellation threshold value selection unit 603 may select a proximity recognition threshold value which is a criterion for determining proximity recognition based on the color of the object according to the proximity sensing instruction 422 of the storage 420. Also, the proximity recognition/cancellation threshold value selection unit 603 may select a proximity cancellation threshold value which is a criterion for determining proximity cancellation based on the color of the object according to the proximity sensing instruction 422 of the storage 420. The proximity recognition/cancellation threshold value selection unit 603 may select the proximity recognition threshold value and the proximity cancellation threshold value regarding the color of the object with reference to proximity recognition/cancellation threshold value information (423 of FIG. 4) of the storage 420. When the proximity sensing light source is set to be driven by a fixed light output power when determining proximity or remoteness of an object, the proximity recognition/cancellation threshold value selection unit 603 may be activated and the light output power adjustment unit 604 may be deactivated.

The light output power adjustment unit 604 may select a light output power value of at least one proximity sensing light source included in the light sensing device 450 based on the color of the object according to the proximity sensing instruction 422 of the storage 420. The light output power adjustment unit 604 may select the light output power value regarding the color of the object with reference to the light output power information 424 of the storage 420. When a fixed proximity recognition threshold value and a fixed proximity cancellation threshold value are set to be used when determining the proximity or remoteness of the object, the light output power adjustment unit 604 may be activated and the proximity recognition/cancellation threshold value selection unit 603 may be deactivated.

The proximity sensing value acquisition unit 605 may acquire a sensing value generated from at least a part of the light sensing device 450 according to the proximity sensing instruction 422 of the storage 420.

The proximity recognition/cancellation determination unit 606 may determine whether proximity is recognized or is canceled based on the sensing value generated from at least a part of the light sensing device 450 according to the proximity sensing instruction 422 of the storage 420. When the proximity sensing light source is set to be driven by a fixed light output power, the proximity recognition/cancel-lation determination unit 606 may determine whether the object moves within a proximity recognition distance of about 10 cm from the light sensing device 450, from out of the proximity recognition distance by comparing the sensing value generated from the light sensing device 450 regarding the object and the proximity recognition threshold value selected based on the color of the object. When the proximity sensing light source is set to be driven by a fixed light output power, the proximity recognition/cancellation determination unit 606 may determine whether the object moves out of a proximity cancellation distance separated from the light sensing device 450 from within the proximity cancellation distance by comparing the sensing value generated from the light sensing device 450 regarding the object and the proximity cancellation threshold value selected based on the color of the object.

According to another embodiment, when the light output power of the proximity sensing light source is set to be adjusted according to the color of the object, the proximity recognition/cancellation determination unit 606 may determine whether the object moves within the proximity recognition distance from the light sensing device 450, from out of the proximity recognition distance by comparing the sensing value generated from the light sensing device 450 regarding the object and a fixed proximity recognition threshold value. When the light output power of the proximity sensing light source is set to be adjusted according to the color of the object, the proximity recognition/cancellation determination unit 606 may determine whether the object moves out of the proximity cancellation distance from the light sensing device 450, from within the proximity cancellation distance by comparing the sensing value generated from the light sensing device 450 regarding the object and a fixed proximity cancellation threshold value.

The function processing unit 607 may process various functions regarding proximity recognition of the object according to the function processing instruction 425 of the storage 420, and may process various functions regarding proximity cancellation of the object according to the function processing instruction 425. The function processing unit 607 may deactivate the display 430 based on the proximity recognition. The controller 490 may activate the display 430 based on the proximity cancellation.

FIG. 7 illustrates a signal processing flow of the controller 490 according to an embodiment of the present disclosure. Referring to FIG. 7, the controller 490 may periodically generate control signals for a series of operation flows for activating or deactivating the display 430 according to a result of determining whether proximity is recognized or is canceled.

The controller 490 may transmit, to the light sensing device 450, a control signal 710 for activating at least a part of the light emitting unit 470. According to the control signal 710, the light sensing device 450 may output light of at least one wavelength band through at least a part of the light emitting unit 470. According to an embodiment, according to the control signal 710, the light sensing device 450 may output both light of a color sensing wavelength band and light of a proximity sensing wavelength band.

The controller 490 may transmit, to the light sensing device 450, a control signal 720 for activating at least a part of the light receiving unit 460. According to the control signal 720, the light sensing device 450 may activate at least a part of the light receiving unit 460 for receiving the light of the color sensing wavelength band.

When there is an object around the light sensing device 450, light outputted from the light emitting unit 470 may be scattered or reflected from the object. The light receiving unit 460 may receive the light scattered or reflected from the object and provide a corresponding color sensing value to the controller 490. The controller 490 may determine a color or a color code of the object from the color sensing value.

When the proximity sensing light source is set to be driven by a fixed light output power when determining the proximity or remoteness of the object, the controller 490 may select a proximity recognition threshold value and a proximity cancellation threshold value based on the color or color code of the object. When a fixed proximity recognition threshold value and a fixed proximity cancellation threshold value are set to be used when determining the proximity or remoteness of the object, the controller 490 may adjust the light output power of the proximity sensing light source based on the color or color code of the object.

The controller 490 may transmit, to the light sensing device 450, a control signal 730 for receiving the light of the proximity sensing wavelength band. According to the control signal 730, the controller 490 may activate at least a part of the light receiving unit 460 for receiving the light of the proximity sensing wavelength band.

The light receiving unit 460 may receive light scattered or reflected from the object, and may provide a corresponding proximity sensing value to the controller 490. The controller 490 may determine proximity recognition or proximity cancellation regarding the object based on the proximity sensing value.

When the proximity sensing light source is set to be driven by a fixed light output power, the controller 490 may determine whether the object moves within the proximity recognition distance from out of the proximity recognition distance by comparing the proximity sensing value generated from the light receiving unit 460 and the proximity recognition threshold value selected based on the color of the object. For example, when the proximity sensing light source is set to be driven by a fixed light output power, the controller 490 may determine whether the object moves out of the proximity cancellation distance from within the proximity cancellation distance by comparing the proximity sensing value generated from the light receiving unit 460 and the proximity cancellation threshold value selected based on the color of the object.

According to another embodiment, when the light output power of the proximity sensing light source is set to be adjusted according to the color of the object, the controller 490 may determine whether the object moves within the proximity recognition distance from out of the proximity recognition distance by comparing the proximity sensing value generated from the light receiving unit 460 and a fixed proximity recognition threshold value. When the light output power of the proximity sensing light source is set to be adjusted according to the color of the object, the controller 490 may determine whether the object moves out of the proximity cancellation distance from within the proximity cancellation distance by comparing the proximity sensing value generated from the light receiving unit 460 and a fixed proximity cancellation threshold value.

The controller 490 may activate or deactivate the display 430 according to the proximity recognition or proximity cancellation determined with respect to the object. For example, when it is determined that the object is in the proximity recognition state, the controller 490 may transmit a control signal 740 for deactivating the display 430, to the display 430. When it is determined that the object is in the proximity cancellation state, the controller 490 may transmit the control signal 740 for activating the display 430 to the display 430.

Figure 8A:
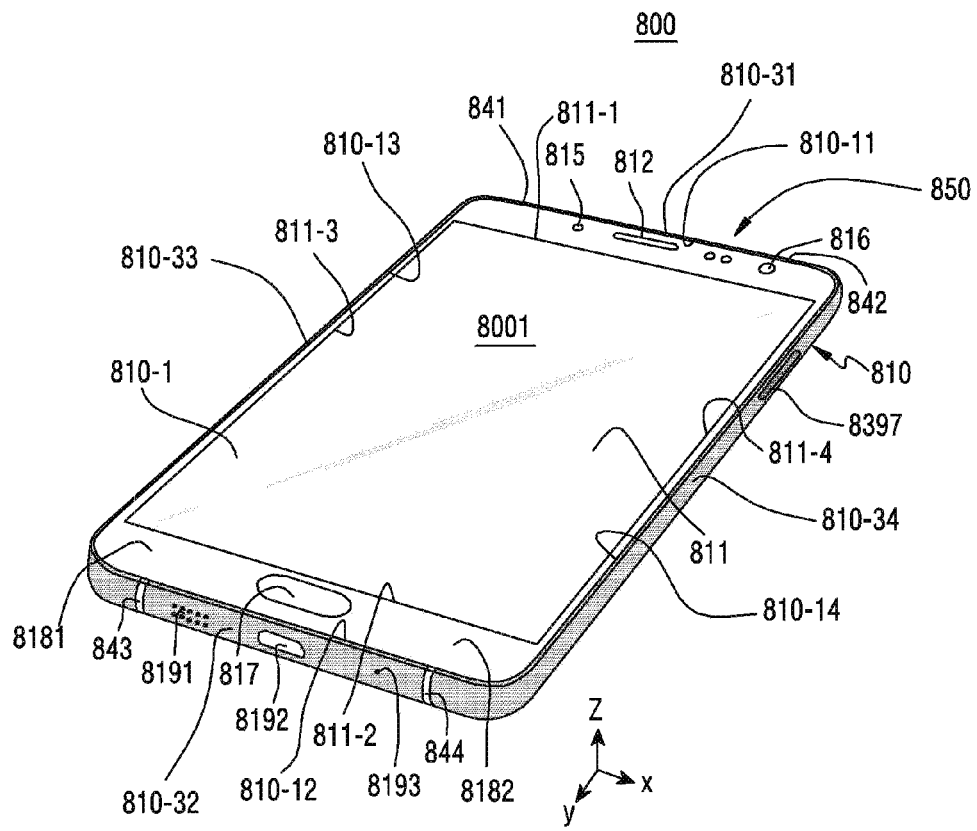
FIGS. 8A, 8B and 8C illustrate an electronic device which provides a proximity sensing function according to an embodiment of the present disclosure.
Figure 8B:
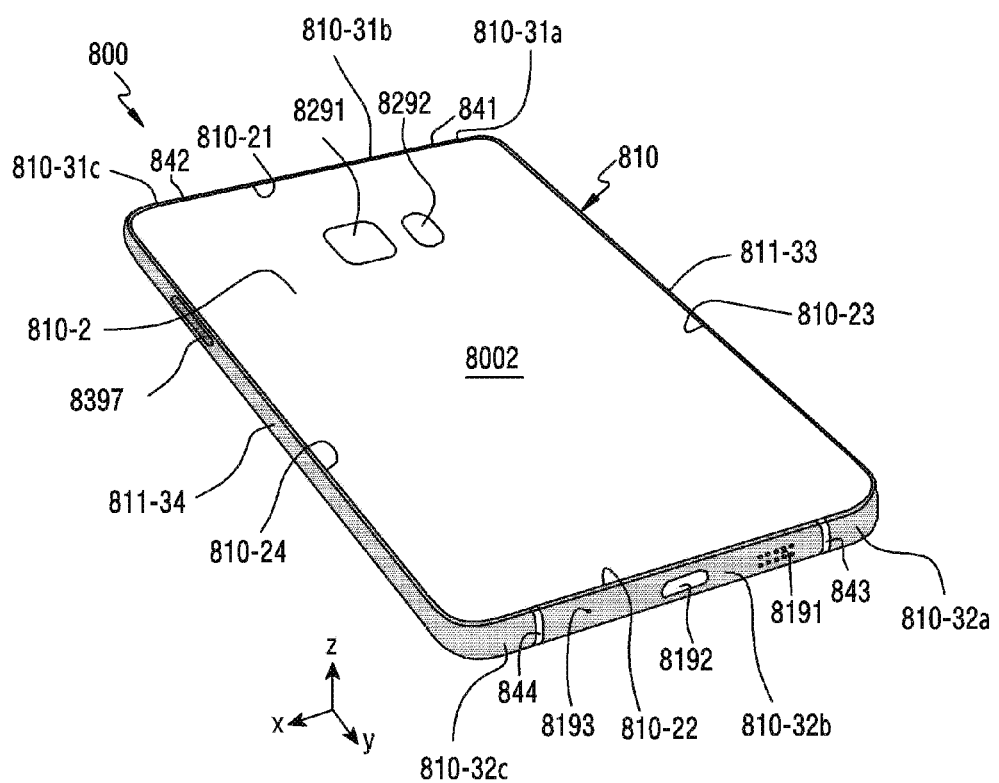
Figure 8C:
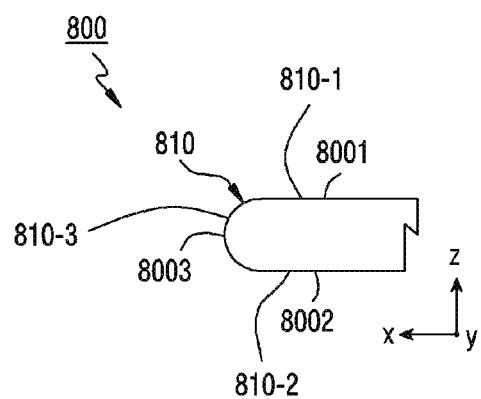
Figure 9:
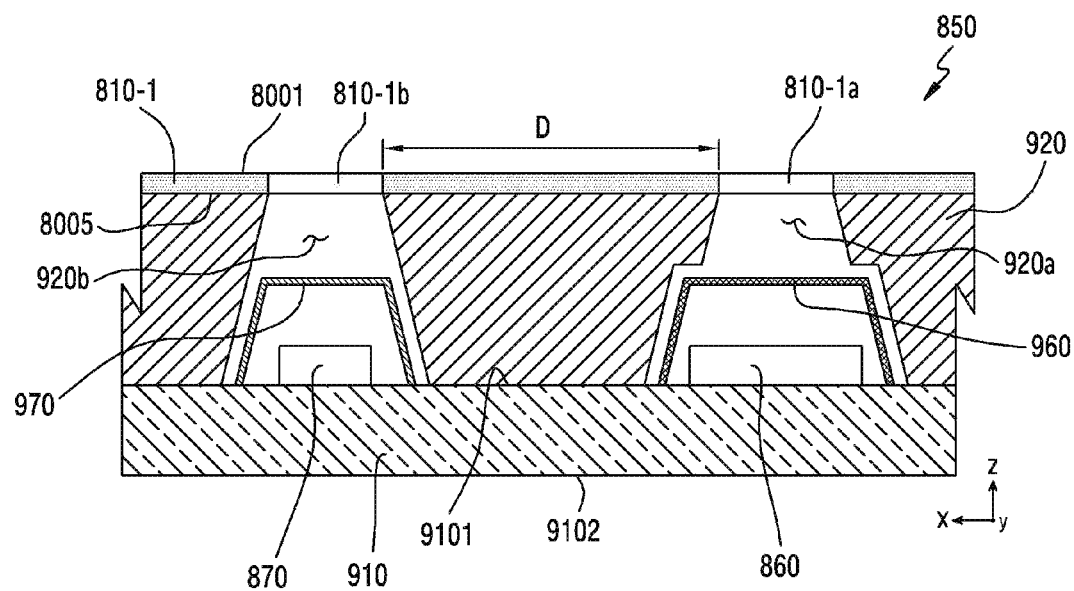
FIG. 9 illustrates a cross-sectional view of a structure related to a proximity sensing device according to an embodiment of the present disclosure.

FIGS. 8A, 8B and 8C illustrate an electronic device providing a proximity sensing function according to an embodiment of the present disclosure. FIG. 9 is a cross-sectional view showing a structure of a proximity sensing device according to an embodiment of the present disclosure. According to embodiments, the electronic device 800 may include at least a portion of the elements of the electronic device 101 of FIG. 1, the electronic device 201 of FIG. 2, or the electronic device 400 of FIG. 4.

The electronic device 800 may include a housing 810 forming an entirety or at least a part of the exterior of the electronic device 800. The housing 810 may include a nonmetallic material and/or a metallic material. For example, the housing 810 may be formed of a material such as plastic, metal, carbon fiber and other fiber composites, ceramic, glass, wood, or a combination of these materials. Alternatively, the housing 810 may be entirely formed of a single material or a combination of a plurality of materials having different properties.

The housing 810 may form a first surface 8001, a second surface 8002, and a third surface 8003 of the electronic device 800. The first surface 8001 and the second surface 8002 may face in opposite directions. The third surface 8003 may be a side surface connecting the first surface 8001 and the second surface 8002.

The first surface 8001 and/or the second surface 8002 of the housing 810 may be substantially planar. The third surface 8003 of the housing 810 may include a plane surface or a curved surface.

The housing 810 may include the first cover 810-1 forming the first surface 8001 and the second cover 810-2 forming the second surface 8002. The housing 810 may include a bezel 810-3 surrounding a space between the first cover 810-1 and the second cover 810-2 and forming the third surface 8003.

The electronic device 800 may include a display 811 which is embedded in a space formed by the first cover 810-1 and the second cover 810-2 of the housing 810. A screen region of the display 811 may be exposed to the outside through the first cover 810-1. The display 811 may further include a touch sensing device for inputting a touch and/or hovering. For example, when a finger or a stylus pen is brought into contact with the first surface 8001, the electronic device 800 may sense a touch input through the display 811, and when the finger or stylus pen is separated from the first surface 8001 in the proximity thereof, the electronic device 800 may sense a hovering input using the display 811.

The screen region of the display 811 may have a substantially rectangular shape including a first short side 811-1, a second short side 811-2, a first long side 811-3, and a second long side 811-4.

The first cover 810-1 may have a substantially rectangular shape including an edge 810-11 adjacent to the first short side 811-1 of the screen region, an edge 810-12 adjacent to the second short side 811-2 of the screen region, an edge 810-13 adjacent to the first long side 811-3 of the screen region, and an edge 810-4 adjacent to the second long side 811-4 of the screen region. Edge 810-13 may connect one end of edge 810-11 and one end of edge 810-12. Edge 810-14 may connect the other end of edge 810-11 and the other end of edge 810-12. A connection portion between edge 810-11 and edge 810-13 may have a curved shape. A connection portion between edge 810-1 and edge 810-14 may have a curved shape. A connection portion between edge 810-12 and edge 810-13 may have a curved shape. A connection portion between edge 810-12 and edge 810-14 may have a curved shape.

According to an embodiment, when viewed from the first cover 810-1 to the second cover 810-2, the second cover 810-2 may have a substantially rectangular shape corresponding to the first cover 810-2.

The second cover 810-2 may have a substantially rectangular shape including edge 810-21 corresponding to edge 810-11 of the first cover 810-1, edge 810-22 corresponding to edge 810-12 of the first cover 810-1, edge 810-23 corresponding to edge 810-13 of the first cover 810-1, and edge 810-24 corresponding to edge 810-14 of the first cover 810-1. Edge 810-22 may connect one end of edge 810-21 and one end of edge 810-22. Edge 810-24 may connect the other end of edge 810-21 and the other end of edge 810-22. A connection portion between edge 810-21 and edge 810-23 may have a curved shape. A connection portion between edge 810-21 and edge 810-24 may have a curved shape. A connection portion between edge 810-22 and edge 810-23 may have a curved shape. A connection portion between edge 810-22 and edge 810-24 may have a curved shape.

The electronic device 800 may include various components, such as a camera 8291 and a flash 8292, arranged in the second cover 810-2.

The first cover 810-1 and/or the second cover 810-2 may be formed of a light transmitting material, such as glass.

The bezel 810-3 may include a first metal frame 810-31 connecting edge 810-11 of the first cover 810-1 and edge 810-21 of the second cover 810-2. The bezel 810-3 may include a second metal frame 810-32 connecting edge 810-12 of the first cover 810-1 and edge 810-22 of the second cover 810-2. The bezel 810-3 may include a third metal frame 810-33 connecting edge 810-13 of the first cover 810-1 and edge 810-23 of the second cover 810-2. The bezel 810-3 may include a fourth metal frame 810-34 connecting edge 810-14 of the first cover 810-1 and edge 810-24 of the second cover 810-2. The first metal frame 810-31 and the second metal frame 810-32 may be disposed in opposite directions, and the third metal frame 810-33 and the fourth metal frame 810-34 may be disposed in opposite directions. The first metal frame 810-31 may connect one end of the third metal frame 810-33 and one end of the fourth metal frame 810-34. The second metal frame 810-32 may connect the other end of the third metal frame 810-33 and the other end of the fourth metal frame 810-34. A combination of the first metal frame 810-31, the second metal frame 810-32, the third metal frame 810-33, and the fourth metal frame 810-34 may have a substantially rectangular ring shape. The third surface 8003 of the housing 810 formed by the bezel 810-3 may have a substantially rectangular ring shape.

A connection portion between the first metal frame 810-31 and the third metal frame 810-33 of the bezel 810-3 may have a curved shape. A connection portion between the first metal frame 810-31 and the fourth metal frame 810-34 of the bezel 810-3 may have a curved shape. A connection portion between the second metal frame 810-32 and the third metal frame 810-33 of the bezel 810-3 may have a curved shape. A connection portion between the second metal frame 810-32 and the fourth metal frame 810-34 of the bezel 810-3 may have a curved shape.

The bezel 810-3 may include an extension portion which extends from at least one of the first metal frame 810-31, the second metal frame 810-32, the third metal frame 810-33, and the fourth metal frame 810-34 in an inward direction of the housing 810. The extension portion, such as a mid-plate, may be coupled to a printed circuit board (PCB) or a bracket.

According to an embodiment, at least one of the first metal frame 810-31, the second metal frame 810-32, the third metal frame 810-33, and the fourth metal frame 810-34 of the bezel 810-3 may include a plurality of metal parts physically separated from one another. A nonconductive member may be disposed between the plurality of metal parts and may form a part of the third surface 8003 of the housing 810. The nonconductive member may extend from a nonconductive portion disposed inside the housing 810.

The first metal frame 810-31 of the bezel 810-3 may include a metal frame 810-31*a*, a metal frame 810-31*b*, and a metal frame 810-31*c* which are physically separated from one another. Metal frame 810-31 may be disposed between metal frame 810-31*a* and metal frame 810-31*c*.

Metal frame 810-31*a* of the first metal frame 810-31 may be connected to the third metal frame 810-33. Metal frame 810-31*c* of the first metal frame 810-31 may be connected to the fourth metal frame 810-34. Metal frame 810-31*a* and the third metal frame 810-33 may be formed of integrated metal. Metal frame 810-31*c* and the fourth metal frame 810-34 may be formed of integrated metal.

The electronic device 800 may include a first nonconductive member 841 disposed between metal frame 810-31*a* and metal frame 810-31*b* of the bezel 810-3. The electronic device 800 may include a second nonconductive member 842 disposed between metal frame 810-31*b* and metal frame 810-31*c*. The first nonconductive member 841 and the second nonconductive member 842 may be seamlessly connected with the first metal frame 810-31 and may form a part of the third surface 8003 of the housing 810. The first nonconductive member 841 and/or the second nonconductive member 842 may be a portion that extends from a nonconductive member, such as a part of a mid-plate, disposed inside the housing 810.

A first gap formed between metal frame 810-31*a* and metal frame 810-31*b* may be a portion that is filled with the first nonconductive member 841. A second gap formed between metal frame 810-31*b* and metal frame 810-31*c* may be a portion that is filled with the second nonconductive member 842. The first gap and the second gap may have the same or different widths.

The second metal frame 810-32 of the bezel 810-3 may include metal frame 810-32*a*, metal frame 810-32*b*, and metal frame 810-32*c* which are physically separated from one another. Metal frame 810-32*b* may be disposed between metal frame 810-32*a* and metal frame 810-32*c*.

Metal frame 810-32*a* of the second metal frame 810-32 may be connected to the third metal frame 810-33. Metal frame 810-32*c* of the second metal frame 810-32 may be connected to the fourth metal frame 810-34. Metal frame 810-32*a* and the third metal frame 810-33 may be formed of integrated metal. Metal frame 810-32*c* and the fourth metal frame 810-34 may be formed of integrated metal.

The electronic device 800 may include a third nonconductive member 843 disposed between metal frame 810-32*a* and metal frame 810-32*b* of the bezel 810-3. The electronic device 800 may include a fourth nonconductive member 844 disposed between metal frame 810-32*b* and metal frame 810-32*c*. The third nonconductive member 843 and the fourth nonconductive member 844 may be seamlessly connected with the second metal frame 810-32 and may form a part of the third surface 8003 of the housing 810. The third nonconductive member 843 and/or the fourth nonconductive member 844 may be a portion that extends from a nonconductive member, such as a part of the mid plate, disposed inside the housing 810.

According to an embodiment, a third gap formed between metal frame 810-32a and metal frame 810-32b may be a portion that is filled with the third nonconductive member 843. A fourth gap formed between metal frame 810-32b and metal frame 810-32c may be a portion that is filled with the fourth nonconductive member 844. The third gap and the fourth gap may have the same or different widths.

The electronic device 800 may include components of various shapes using the bezel 810-3. For example, metal frame 810-32b of the bezel 810-3 may include a plurality of passing holes 8191 for supporting a speaker. Sounds from the speakers mounted inside the electronic device 800 may be discharged to the outside through the plurality of passing holes 8191. For example, metal frame 810-32b of the bezel 810-3 may include a passing hole 8193 for supporting a microphone. Sounds from the outside may be transmitted to a microphone mounted inside the electronic device 800 through the passing holes 8193. For example, metal frame 810-32b of the bezel 810-3 may include a passing hole 8192 for supporting a USB connector. A connector of an external device may be connected to a connector which is mounted inside the electronic device 800 through the passing hole 8192. For example, the fourth metal frame 810-34 of the bezel 810-3 may include a passing hole for supporting a button 8397. The third metal frame 810-33 of the bezel 810-3 may include a passing hole for supporting a button.

When viewed in the direction from the first cover 810-1 to the second cover 810-2, the electronic device 800 may include various components such as input keys arranged between edge 810-12 of the first cover 810-1 and the second short side 811-2 of the screen region. The input key may be a home button 817 of a pressing method or touch keys 8181, 8182 of a touch method.

When viewed in the direction from the first cover 810-1 to the second cover 810-2, the electronic device 800 may include various components arranged between edge 810-11 of the first cover 810-1 and the first short side 811-1 of the screen region. For example, the components may include a receiver 812 to output a voice signal received from the other device during a call as a sound. The components may include a camera module 816. The components may include a light emitting element 815, such as an LED indicating various states of the electronic device 800. For example, when a remaining capacity of a battery is low, the electronic device 800 may turn on the light emitting element 815 according to a user environment setting. The electronic device 800 may turn on the light emitting element 815 only when the screen is turned off according to user environment setting, or when the electronic device 800 is connected to a charger according to user environment setting. The electronic device 800 may enable the light emitting element 815 to emit light in various colors according to various states of the electronic device 800.

When viewed in the direction from the first cover 810-1 to the second cover 810-2, the electronic device 800 may include a light sensing device 850 disposed between edge 810-11 of the first cover 810-1 and the first short side 811-1 of the screen region. The light sensing device 850 may measure intensities of various wavelength bands of light, and the electronic device 800 may analyze a material quantitatively or qualitatively using data measured by the light sensing device 850.

When viewed in the direction from the first cover 810-1 to the second cover 810-2, the light sensing device 850 may be disposed between the receiver 812 and the camera module 816.

The light sensing device 850 may send light to the outside and receive light from the outside through at least one of one or more light passing regions formed in the first cover 810-1.

The light sensing device 850 may be similar to or same as the light sensing device 450 of FIG. 4 at least in part.

FIG. 9 is a cross-sectional view showing a structure of the light sensing device 850 according to an embodiment of the present disclosure. Referring to FIG. 9, the light sensing device 850 may include a light receiving unit 860 that may convert light energy (or a light signal) into electric energy (or an electric signal), and a light emitting unit 870 that may convert electric energy into light energy. Light, such as ultraviolet rays, visible rays, or infrared rays, emitted from the light emitting unit 870 may be irradiated onto an object and light reflected from the object may enter the light receiving unit 860.

The light receiving unit 860 and the light emitting unit 870 may be disposed in and electrically connected to a PCB 910 of the electronic device 800. For example, the PCB 910 may include a first surface 9101 facing the first surface 8001 of the electronic device 800, and a second surface 9102 facing the second surface 8002 of the electronic device 800. The light receiving unit 860 and the light emitting unit 870 may be disposed on the first surface 9101 of the PCB 910 and between the first cover 810-1 and the PCB 910.

The light sensing device 850 may include a first light transmission region 810-1a formed in the first cover 810-1. When viewed in the direction from the first cover 810-1 to the second cover 810-2, the first light transmission region 810-1a may be disposed between edge 810-11 of the first cover 810-1 and the first short side 811-1 of the screen region. When viewed in the cross-sectional view, the first light transmission region 810-1a and the light receiving unit 860 may be aligned vertically. External light may be transmitted to the light receiving unit 860 through the first light transmission region 810-1a.

The light sensing device 850 may include a second light transmission region 810-1b formed in the first cover 810-1. When viewed in the direction from the first cover 810-1 to the second cover 810-2, the second light transmission region 810-1b may be disposed between edge 810-11 of the first cover 810-1 and the first short side 811-1 of the screen region. When viewed in the cross-sectional view, the second light transmission region 810-1b and the light emitting unit 870 may be vertically aligned. Light generated from the light emitting unit 870 may be discharged to the outside through the second light transmission region 810-1b.

When viewed in the direction from the first cover 810-1 to the second cover 810-2, a region between edge 810-11 of the first cover 810-1 and the first short side 811-1 of the screen region may be formed lengthwise in an x-axis direction from edge 810-13 of the first cover 810-1 to edge 810-14, and may be divided into a left region formed on the side of edge 810-13 with reference to the receiver 812 and a right region formed on the side of edge 810-14. The first light transmission region 810-1a and the second light transmission region 810-1b may be disposed on the right region.

According to an embodiment, when viewed in the direction from the first cover 810-1 to the second cover 810-2, the second light transmission region 810-1b may be disposed between the receiver 812 and the first light transmission region 810-1a as shown in the drawing.

When viewed in the direction from the first cover 810-1 to the second cover 810-2, the first light transmission region 810-1a may be disposed between the receiver 812 and the second light transmission region 810-1b. When the location of the first light transmission region 810-1a is changed, locations of elements related to the first light transmission region 810-1a, such as a first penetrating portion 920a, a first light transmission member 960, and the light receiving unit 860, may also be changed.

The first light transmission region 810-1a and the second light transmission region 810-1b may be aligned in the x-axis direction from edge 810-14 of the first cover 810-1 to edge 810-13. A distance D between the first light transmission region 810-1a and the second light transmission region 810-1b may be less than or equal to about 10 mm, for example.

The first light transmission region 810-1a and the second light transmission region 810-1b may be designed to be aligned in a y-axis direction from edge 810-12 of the first cover 810-1 to edge 810-11.

When viewed in the direction from the first cover 810-1 to the second cover 810-2, the first light transmission region 810-1a and/or the second light transmission region 810-1b may be substantially circular or may have various other shapes.

When viewed in the direction from the first cover 810-1 to the second cover 810-2, the first light transmission region 810-1a and the second light transmission region 810-1b may have the same size or area or may have different sizes or areas.

The light receiving unit 860 and the light emitting unit 870 and the first light transmission region 810-1a and the second light transmission region 810-1b associated thereto are not limited to an embodiment of FIG. 9 and may be disposed in various other locations or shapes.

The first light transmission region 810-1a and/or the second light transmission region 810-1b may be designed to be formed of material or in a shape enabling light to pass therethrough without deforming, such as by distortion or absorption. For example, the first light transmission region 810-1a and/or the second light transmission region 810-1b may have a high light transmission rate, such as at least 90%, or a low light transmission rate, such as about 5%. For example, when viewed in the cross-sectional view, the first light transmission region 810-1a and/or the second light transmission region 810-1b may have a planar shape having a substantially uniform thickness as illustrated, or may have a convex shape in the direction from the first cover 810-1 to the 15 second cover 810-2.

When viewed in the direction from the first cover 810-1 to the second cover 810-2, a region formed between edge 810-11 of the first cover 810-1 and the first short side 811-1 of the screen region except for the first light transmission region 810-1a and the 20 second light transmission region 810-1b may be opaquely designed. For example, a black layer may be coupled to a part of an inner surface 8005 of the first cover 810-1.

When viewed in the cross-sectional view, the light sensing device 850 may further include a spacer 920 disposed between the first cover 810-1 and the PCB 910. The spacer 920 may include a first penetrating portion 920a and a second penetrating portion 920b. The first penetrating portion 920a may provide a space between the light receiving unit 860 and the first light transmission region 810-1a. External light may be transmitted to the light receiving unit 860 through the first penetrating portion 920a. The second penetrating portion 920b may provide a space between the light emitting unit 870 and the 30 second light transmission region 810-1b. External light may be transmitted to the light receiving unit 860 through the first penetrating portion 920a.

The first penetrating portion 920a may be designed to enable external light to be transmitted to the light receiving unit 860 without deforming. The second penetrating portion 920b may be designed to enable light from the light emitting unit 870 to be discharged to the outside without deforming. For example, the first penetrating portion 920a may have a material or a shape for preventing light of a plurality of wavelength bands that can be sensed by the light receiving unit 860 from being absorbed therein. The second penetrating portion 920b may have a material or shape for preventing light of one or more wavelength bands discharged from the light emitting unit 870 from being absorbed therein. The first penetrating portion 920a and/or the second penetrating portion 920b may have a substantially tapering shape in a direction from the second cover 810-2 to the first cover 810-2.

The spacer 920 may support other devices installed adjacent to edge 810-11 of the first cover 810-1, as well as the light sensing device 850. For example, the spacer 920 may include a forming portion for supporting the receiver 812 although it is not shown in the drawing.

The light sensing device 850 may further include a first light transmission member 960, such as a lens, disposed between the first cover 810-1 and the PCB 910. For example, the first light transmission member 960 may be disposed in a space of the first penetrating portion 920a of the spacer 920 and may be designed in a shape to cover the light receiving unit 860 disposed on the PCB 910, and to enable external light to be transmitted to the light receiving unit 860 without deforming. The first light transmission member 960 may be designed to enable external light to be collected at the light receiving unit 860.

The light sensing device 850 may further include a second light transmission member 970 disposed between the first cover 810-1 and the PCB 910. For example, the second light transmission member 970 may be disposed in a space of the second penetrating portion 920b of the spacer 920, and may be designed in a shape to cover the light emitting unit 870 disposed on the PCB 910, and to enable light from the light emitting unit 870 to be discharged to the outside without deforming. For example, the second light transmission member 970 may enable light from the light emitting unit 870 to have directivity when the light is discharged to the outside. The first light transmission member 960 or the second light transmission member 970 may be omitted.

The light receiving unit 860 may include one or more optical filters. One or more light detectors may be disposed between the optical filter and the PCB 910. The optical filter may selectively enable light of a predetermined wavelength band to pass therethrough and/or blocks penetration of light. The light detector may be designed to include the optical filter.

For example, the light detector may be designed to sense a light signal of a single wavelength band and an optical filter for enabling only the light of the single wavelength band may be applied to the light detector.

In another example, the light detector may be designed to sense light signals of at least two wavelength bands, and an optical filter for enabling only the light of at least two wavelength bands may be applied to the light detector.

The light sensing device 850 may use a single light transmission region formed in the first cover 810-1. For example, light outputted from the light emitting unit 870 may be discharged to the outside through the single light transmission region formed in the first cover 810-1, and light scattered or reflected from an object may enter the light receiving unit 860 through the single light transmission region formed in the first cover 810-1.

The light sensing device 850 may be provided as a single module in the form of a system in package (SIP).

According to embodiments of the present disclosure, an electronic device may include at least one sensor configured to acquire color information of an object, a light emitting unit configured to output light of at least one wavelength band, a light receiving unit configured to receive the light of the at least one wavelength band, a processor electrically connected with the at least one sensor, the light emitting unit, and the light receiving unit, and a memory electrically connected with the processor and storing instructions. The instructions, when being executed, cause the processor to acquire the color information of the object using the at least one sensor, determine an output intensity of the light emitting unit or at least one threshold value based on the acquired color information of the object, and determine proximity or remoteness of the object based on light scattered or reflected from the object received by the light receiving unit, by using the determined output intensity of the light emitting unit or the at least one threshold value.

The instructions may cause the processor to fix the at least one threshold value as a set value when selecting the output intensity of the light emitting unit based on the color information of the object, and determine the proximity or remoteness of the object by comparing a value corresponding to the light scattered or reflected from the object received by the light receiving unit under the selected output intensity of the light emitting unit and the fixed at least one threshold value.

The instructions may cause the processor to fix the output intensity of the light emitting unit as a set value when selecting the at least one threshold value based on the color information of the object, and determine the proximity or remoteness of the object by comparing a value corresponding to the light scattered or reflected from the object received by the light receiving unit under the fixed output intensity of the light emitting unit and the selected at least one threshold value.

The instructions may cause the processor to select a first threshold value based on the color information of the object and select a second threshold value which is less than the first threshold value, output light through the light emitting unit with the fixed output intensity and receive at least a part of light scattered or reflected from the object through the light receiving unit, when a value corresponding to the received light is greater than the first threshold value, recognize that the object is located in the proximity of the electronic device, and, after recognizing that the object is located in the proximity of the electronic device, when a value corresponding to light received through the light receiving unit is less than the second threshold value, recognize that the object is not located in the proximity of the electronic device.

The at least one sensor may include a spectrum sensor or an image sensor.

The spectrum sensor may be at least a part of the light emitting unit and the light receiving unit.

The spectrum sensor, the light emitting unit, and the light receiving unit may be included in a proximity sensor.

At least a part of the light emitting unit may include at least one light emitting region of a display installed in the electronic device.

The electronic device may further include a housing, and a display exposed through one surface of the housing. The light receiving unit and the light emitting unit may be disposed on the periphery of the display.

When it is determined that the object is in the proximity of the electronic device, the instructions may cause the processor to deactivate a display installed in the electronic device.

The instructions may cause the processor to, when execution of a specific application is sensed, acquire the color information of the object using the at least one sensor, to determine the output intensity of the light emitting unit or the at least one threshold value based on the acquired color information of the object, and to determine the proximity or remoteness of the object based on light received by the light receiving unit, by using the determined output intensity of the light emitting unit or the at least one threshold value.

The specific application may include a call-related application.

The at least one wavelength band may include at least one of peak sensitivity wavelengths of 940 nm and 950 nm.

The at least one sensor may output light and generate the color information of the object using light scattered or reflected from the object. Light outputted from the at least one sensor may include a wavelength band including at least one of peak sensitivity wavelengths of 568 nm, 660 nm, and 880 nm.

Figure 10:
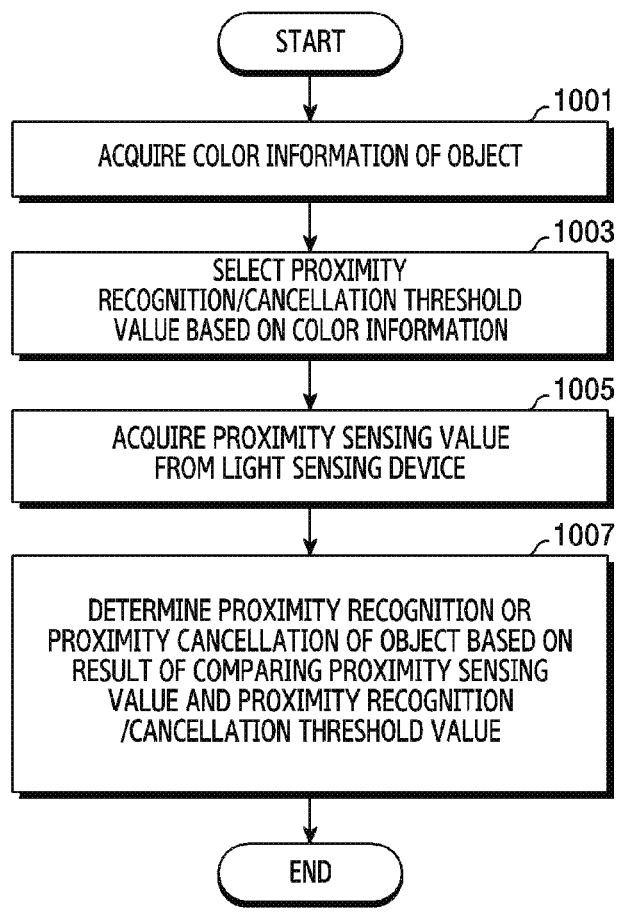
FIG. 10 illustrates an operation flow related to a method for determining proximity or remoteness of an object according to an embodiment of the present disclosure.

FIG. 10 illustrate an operation flow regarding a method for determining proximity or remoteness of an object according to an embodiment of the present disclosure.

Referring to FIG. 10, in step 1001, the controller may acquire color information regarding a color of an object located around the electronic device. Referring back to FIG. 4, according to an embodiment, the controller 490 may acquire a color sensing value regarding the color of the object located around the electronic device from at least one element installed in the electronic device 400, by using at least a part of the light sensing device 450 or by using the camera 481. The controller may determine a color code of the object from the color sensing value.

In step 1003, the controller may select a proximity recognition threshold value and a proximity recognition cancellation threshold value based on the color information, such as the color sensing value or the color code. Referring back to FIG. 4, according to an embodiment, the controller 490 may select the proximity recognition threshold value and the proximity recognition cancellation threshold value corresponding to the color information of the object from the proximity recognition/cancellation threshold value information 423.

In step 1005, the controller may acquire a proximity sensing value regarding the object from the light sensing device. Referring back to FIG. 4, according to an embodiment, the light emitting unit 470 may emit light of a proximity sensing wavelength band and light scattered or reflected from the object may be sensed by the light receiving unit 460.

In step 1007, the controller may compare the proximity sensing value and the proximity recognition threshold value, and may determine whether the proximity of the object is recognized or not based on the result of comparing. Referring back to FIG. 4, according to an embodiment, when the proximity sensing light source is set to be driven by a fixed light output power, the controller 490 may determine whether the object moves within a proximity recognition distance from out of the proximity recognition distance by comparing the proximity sensing value generated from the light receiving unit 460 and the proximity recognition threshold value selected based on the color of the object.

In step 1007, the controller may compare the proximity sensing value and the proximity cancellation threshold value, and may determine whether the proximity of the object is canceled or not based on the result of comparing. Referring back to FIG. 4, according to an embodiment, when the proximity sensing light source is set to be driven by a fixed light output power, the controller 490 may determine whether the object moves out of a proximity cancellation distance from within the proximity cancellation distance by comparing the proximity sensing value generated from the light receiving unit 460 and the proximity cancellation threshold value selected based on the color of the object.

In FIG. 10, when the proximity or remoteness of the object is determined based on the amount of light reflected from the object in the state where the proximity sensing light source is set to be driven by the fixed light output power, a threshold which is a criterion for determining whether the proximity is recognized or whether the proximity is canceled is selected based on the color of the object. Therefore, an error in determining proximity or remoteness of an object can be reduced.

Figure 11:
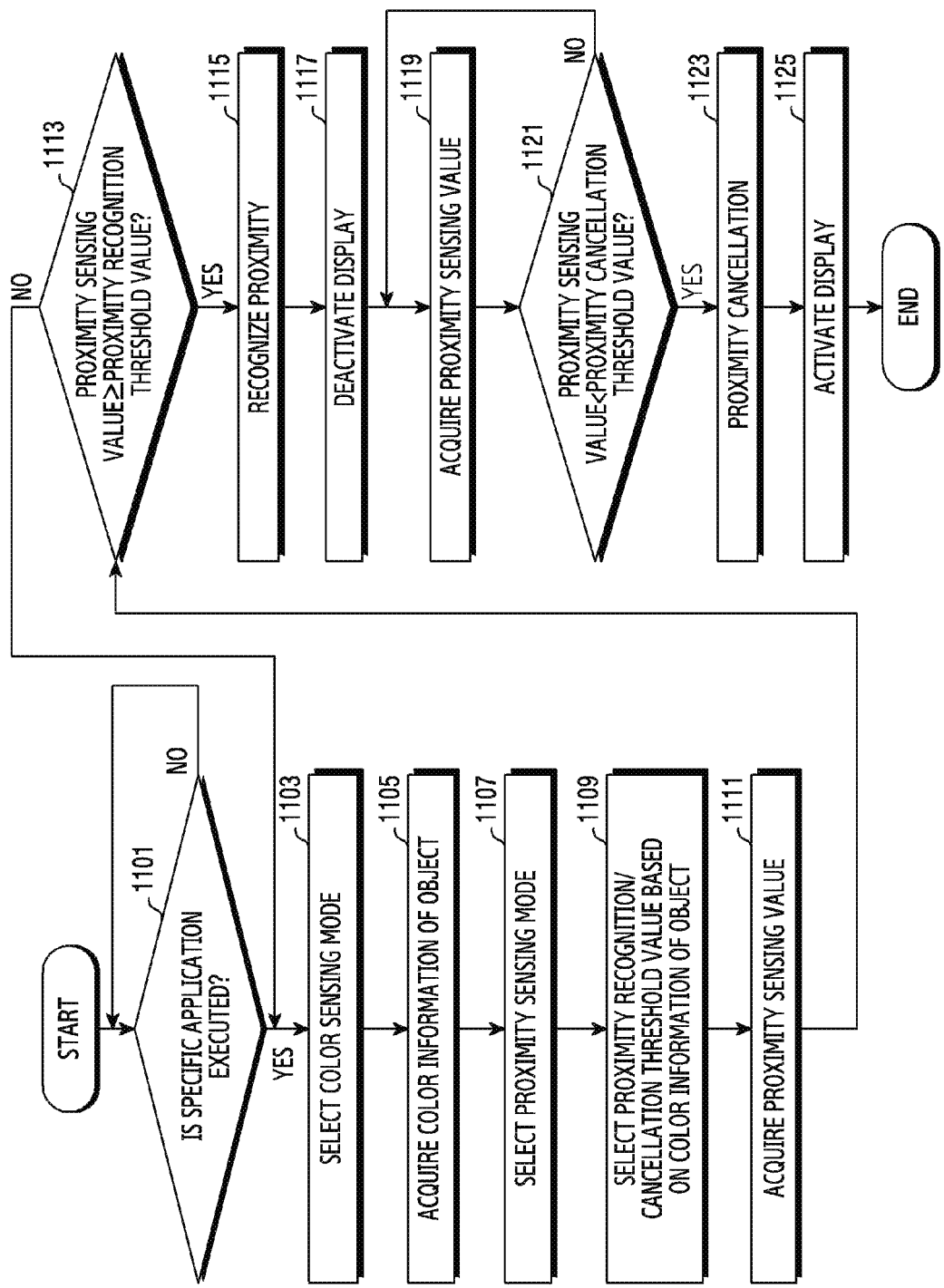
FIG. 11 illustrates an operation flow for determining proximity or remoteness of an object and an operation flow according to the result of determining according to embodiments of the present disclosure.
Figure 14:
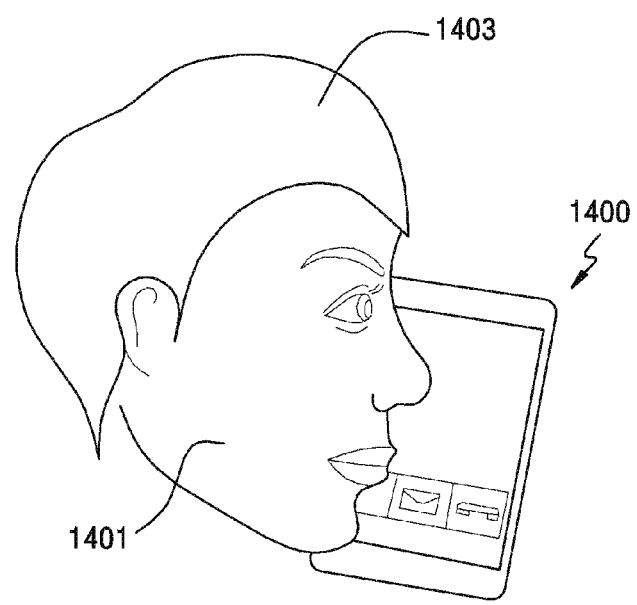
FIG. 14 illustrates the operation flow of FIG. 11.

FIG. 11 illustrates a flowchart for determining proximity or remoteness of an object and an operation flow according to embodiments of the present disclosure. FIG. 14 illustrates the operation flow of FIG. 11.

Referring to FIG. 11, when a specific application is executed in step 1101, the controller may perform step 1103. The specific application may include various types of applications that can be used when the electronic device is used in the proximity of a user body.

The specific application may be a call application. When the call application is executed, the electronic device may be used in the proximity of a user head to make a call. When a call is requested to a phone number of an external device by a user input, the controller may execute a sent call application. The electronic device may receive a call from an external device and the controller may execute a received call application.

The specific application may be an application using the light sensing device, such as a biometric application for a sensing of biometric data. When the biometric application is executed, the electronic device may be used in the proximity of a user skin to sense skin moisture, skin melanin, or erythema, for example.

In step 1103, the controller may select a color sensing mode based on the executed specific application. Referring back to FIG. 4, according to an embodiment, the controller 490 may control the light emitting unit 470 based on the color sensing mode, and the light emitting unit 470 may output light of a sensing wavelength band corresponding to the color sensing mode. The controller 490 may control the light receiving unit 460 based on the color sensing mode, and the light receiving unit may activate at least a part that can receive the light of the sensing wavelength band corresponding to the color sensing mode. According to another embodiment, the controller 490 may activate the camera 481 based on the color sensing mode.

The sensing wavelength band for the color sensing mode may be a wavelength band that includes at least one of peak sensitivity wavelengths of about 568 nm, 660 nm, and 880 nm.

In step 1105, the controller may acquire color information regarding a color of the object located around the electronic device through the color sensing mode. For example, the controller acquire a color sensing value related to the color of the object located around the electronic device from at least one element installed in the electronic device. Referring back to FIG. 4, according to an embodiment, the color sensing value may be acquired through at least a part of the light receiving unit 460 or by using the camera 481. The controller may determine a color code of the object based on the color sensing value.

In step 1107, the controller may select a proximity sensing mode based on the executed specific application. Referring back to FIG. 4, the controller 490 may control the light emitting unit 470 based on the proximity sensing mode, and the light emitting unit 470 may output light of a sensing wavelength band corresponding to the proximity sensing mode. The controller 490 may control the light receiving unit 460 based on the proximity sensing mode, and the light receiving unit 460 may activate at least a part that can receive the light of the sensing wavelength band corresponding to the proximity sensing mode.

The sensing wavelength band for the proximity sensing mode may be different from the sensing wavelength band for the color sensing mode. The wavelength band for the proximity sensing mode may be a wavelength band including at least one of peak sensitivity wavelengths of about 940 nm and 950 nm.

In step 1109, the controller may select a proximity recognition/cancellation threshold value based on the color information, such as the color sensing value or the color code of the object. Referring back to FIG. 4, according to an embodiment, the controller 490 may select a proximity recognition threshold value and a proximity cancellation threshold value corresponding to the color information such as the color code of the object from the proximity recognition/cancellation threshold value information 423.

In step 1111, the controller may acquire a proximity sensing value regarding the object through the proximity sensing mode. Referring back to FIG. 4, according an embodiment, the light emitting unit 470 may emit the light of the proximity sensing wavelength band, and light scattered or reflected from the object may be sensed by the light receiving unit 460.

In step 1113, the controller may compare the proximity sensing value and the proximity recognition threshold value. When the proximity sensing value is greater than or equal to the proximity recognition threshold value, the controller may determine that the object moves within a proximity recognition distance from out of the proximity recognition distance in step 1115. When the proximity sensing value is less than the proximity recognition threshold value, the controller may resume step 1103. In addition, the controller may resume step 1111 when the proximity sensing value is less than the proximity recognition threshold value.

In step 1117, the controller may deactivate the display in response to the proximity being recognized.

In step 1119, the controller may acquire a proximity sensing value regarding the object through the proximity sensing mode.

In step 1121, the controller may compare the proximity sensing value and the proximity cancellation threshold value. When the proximity sensing value is less than the proximity cancellation threshold value, the controller 490 may determine that the object moves out of a proximity cancellation distance in step 1123. When the proximity sensing value is greater than or equal to the proximity cancellation threshold value, the controller may resume step 1119.

In step 1125, the controller may activate the display in response to the proximity being canceled.

Referring to FIG. 14, a color of skin 1401 or hair 1403 varies from user to user. Since an amount of light reflected from the user's skin 1401 or hair 1403 varies according to the color of the object corresponding to the proximity sensor, a method of determining proximity or remoteness of an object only based on the amount of light reflected from the user's skin 1401 or hair 1403 does not guarantee reliability. In FIG. 11, when proximity or remoteness of an object is determined based on the amount of light reflected from the object when the proximity sensing light source is set to be driven by a fixed light output power, a threshold value which is a criterion for determining whether proximity is recognized or whether proximity is canceled is selected based on the color (or reflection rate) of the object. Therefore, an error in determining the proximity or distance of the object can be reduced.

Figure 12:
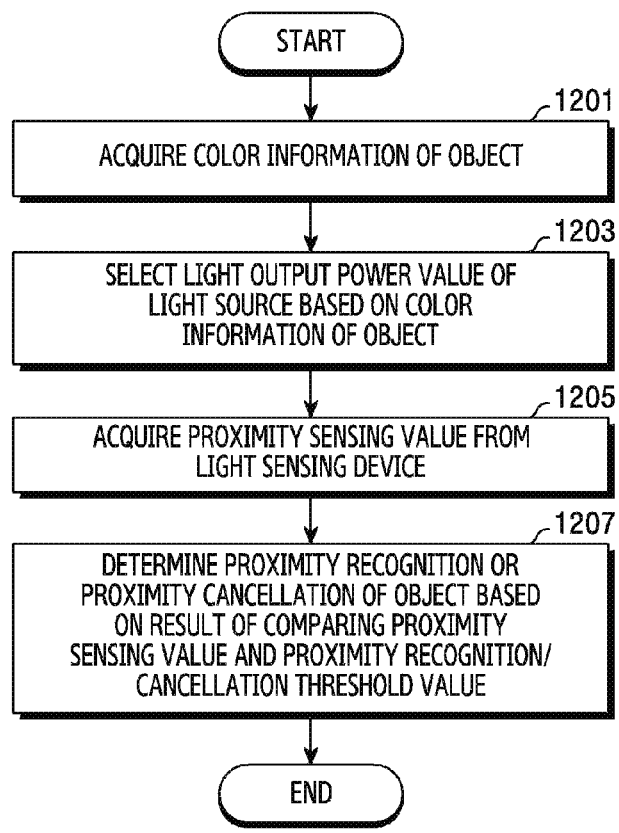
FIG. 12 illustrates an operation flow related to a method for determining proximity or remoteness of an object according to an embodiment of the present disclosure.

FIG. 12 illustrates a flowchart related to a method for determining proximity or remoteness of an object according to an embodiment of the present disclosure.

Referring to FIG. 12, in step 1201, the controller may acquire color information regarding a color of an object located around the electronic device. Referring back to FIG. 4, according to an embodiment, the controller 490 may acquire a color sensing value regarding the color of the object located around the electronic device 400 from at least one element installed in the electronic device 400. For example, the color sensing value be acquired by using at least a part of the light sensing device 450 or by using the camera 481. The controller 490 may determine a color code of the object from the color sensing value.

In step 1203, the controller may select a light output power value of the proximity sensing light source based on the color information of the object, such as the color sensing value or color code. Referring back to FIG. 4, the controller 490 may select a light output power value corresponding to the color information of the object from the light output power information 425. The proximity sensing light source may be driven by the selected light output power value and may output light of an intensity proportional to the light output power value.

In step 1205, the controller may acquire a proximity sensing value regarding the object from the light sensing device. Referring back to FIG. 4, the light emitting unit 470 may emit light of a proximity sensing wavelength band, and light scattered or reflected from the object may be sensed by the light receiving unit 460.

In step 1207, the controller may compare the proximity sensing value and a proximity recognition threshold value, and determine whether the proximity of the object is recognized based on the result of comparing. The controller may compare the proximity sensing value and a proximity cancellation threshold value, and may determine whether the proximity of the object is canceled based on the result of comparing.

When a fixed proximity recognition threshold value is used and an intensity of light emitted from a light source is uniform, an amount of light reflected from a first object and an amount of light reflected from a second object may be different from each other, which may cause an error in that a proximity recognition distance to the first object and a proximity recognition distance to the second object are not identical to each other. When a fixed proximity cancellation threshold value is used and an intensity of light emitted from a light source is uniform, there may be an error in that a proximity cancellation distance to the first object and a proximity cancellation distance to the second object are not identical to each other.

According to an embodiment, when a fixed proximity recognition threshold value and/or proximity cancellation threshold value are designed to be used in determining proximity or remoteness of an object, the method of FIG. 12 may reduce the above-described error by adjusting the light output power of the light source based on the color (or reflection rate) of the object. For example, when it is determined that the object has a color of a first light reflection rate, the electronic device may select a first light output power value corresponding to the color of the first reflection rate. When it is determined that the object has a color of a second light reflection rate higher than the first light reflection rate, the electronic device may select a second light output power value lower than the first light output power value to correspond to the color of the second reflection rate. Since the amount of light reflected from the first object by the light of the intensity according to the first light output power value and the amount of light reflected from the second object by the light of the intensity according to the second light output power value are substantially identical to each other at the same distance from the light sensing device, the above-described error can be reduced.

Figure 13:
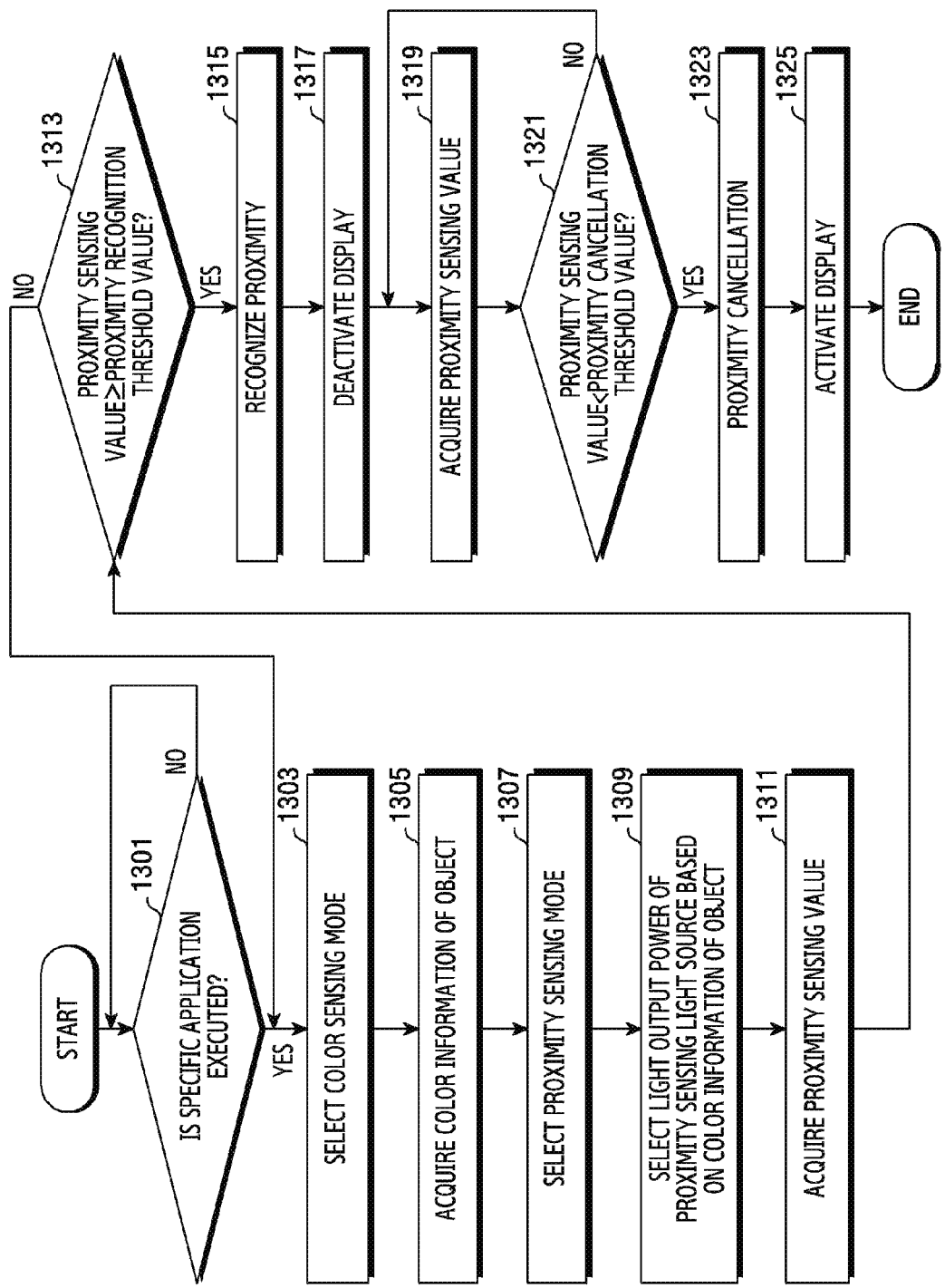
FIG. 13 illustrates an operation flow for determining proximity or remoteness of an object and an operation flow according to the result of determining according to embodiments of the present disclosure.

FIG. 13 illustrates flowchart for determining proximity or remoteness of an object and an operation flow according to the result of determining according to embodiments of the present disclosure.

Referring to FIG. 13, when a specific application is executed in step 1301, the controller may perform step 1303. The specific application may include various types of applications which can be used when the electronic device is used in the proximity of a user body.

The specific application may be a call application. When the call application is executed, the electronic device 400 may be used in the proximity of a user head to make a call.

The specific application may be an application using the light sensing device, such as a biometric application for sensing of biometric data.

In step 1303, the controller may select a color sensing mode based on the executed specific application. Referring back to FIG. 4, the controller 490 may control the light emitting unit 470 based on the color sensing mode, and the light emitting unit 470 may output light of a sensing wavelength band corresponding to the color sensing mode. The controller 490 may control the light receiving unit 460 based on the color sensing mode, and the light receiving unit 460 may activate at least a part that can receive the light of the sensing wavelength band corresponding to the color sensing mode. According to another embodiment, the controller 490 may activate the camera 481 based on the color sensing mode.

The sensing wavelength band for the color sensing mode may be a wavelength band that includes at least one of peak sensitivity wavelengths of about 568 nm, 660 nm, and 880 nm.

In step 1305, the controller may acquire color information regarding the color of the object located around the electronic device in the color sensing mode. Referring back to FIG. 4, according an embodiment, the controller 490 may acquire a color sensing value regarding the color of the object located around the electronic device 400 from at least one element installed in the electronic device 400. For example, the color sensing value may be acquired through at least a part of the light receiving unit 460 or by using the camera 481. The controller 490 may determine a color code of the object from the color sensing value.

In step 1307, the controller may select a proximity sensing mode based on the executed specific application, and may control the light emitting unit based on the proximity sensing mode, and the light emitting unit may output light of a sensing wavelength band corresponding to the proximity sensing mode. The controller may control the light receiving unit based on the proximity sensing mode, and the light receiving unit may activate at least a part that can receive the light of the sensing wavelength band corresponding to the proximity sensing mode.

The sensing wavelength band for the proximity sensing mode may be different from the sensing wavelength band for the color sensing mode. The wavelength band for the proximity sensing mode may be a wavelength band that includes at least one of peak sensitivity wavelengths of about 940 nm and 950 nm.

In step 1309, the controller may select a light output power value of the proximity sensing mode light source based on the color sensing value or the color code of the object. Referring back to FIG. 4 the controller 490 may select a light output power value corresponding to the color code of the object from the light output power information 424.

In step 1311, the controller may acquire a proximity sensing value regarding the object through the proximity sensing mode. The light emitting unit may emit the light of the proximity sensing wavelength band, and light scattered or reflected from the object may be sensed by the light receiving unit.

In step 1313, the controller may compare the proximity sensing value and a proximity recognition threshold value. When the proximity sensing value is greater than or equal to the proximity recognition threshold value, the controller may determine that the object moves within a proximity recognition distance from out of the proximity recognition distance in step 1315. When the proximity sensing value is less than the proximity recognition threshold value, the controller may resume step 1303. According to another embodiment, although not shown, an operation flow in which, when the proximity sensing value is less than the proximity recognition threshold value, the controller resumes step 1311 may be possible.

In step 1317, the controller may deactivate the display 430 in response to the proximity being recognized.

In step 1319, the controller may acquire a proximity sensing value regarding the object through the proximity sensing mode.

In step 1321, the controller may compare the proximity sensing value and a proximity cancellation threshold value. When the proximity sensing value is less than the proximity cancellation threshold value, the controller 490 may determine that the object moves out of a proximity cancellation distance in step 1323. When the proximity sensing value is greater than or equal to the proximity cancellation threshold value, the controller may resume step 1319.

In step 1325, the controller may activate the display in response to the proximity being canceled.

When a fixed proximity recognition threshold value is used and an intensity of light emitted from a light source is uniform, an amount of light reflected from a first object and an amount of light reflected from a second object may be different from each other, and there may be an error in that a proximity recognition distance to the first object and a proximity recognition distance to the second object are not identical to each other. When a fixed proximity cancellation threshold value is used and an intensity of light emitted from a light source is uniform, there may be an error in that a proximity cancellation distance to the first object and a proximity cancellation distance to the second object are not identical to each other.

Referring to FIG. 14, a color of a skin 1401 or hair 1403 varies from user to user. Since an amount of light reflected from the user's skin 1401 or hair 1403 varies according to the color of the object corresponding to the proximity sensor, a method of determining proximity or remoteness of an object only based on the amount of light reflected from the user's skin 1401 or hair 1403 does not guarantee reliability. In of FIG. 13, when a fixed proximity recognition threshold vale and/or a fixed proximity cancellation threshold value is designed to be used in determining the proximity or remoteness of the object, the above-described error can be reduced by adjusting the light output power of the light source based on the color (or reflection rate) of the object.

According to embodiments of the present disclosure, a method for operating of an electronic device may include acquiring color information of an object, determining an output intensity of a light emitting unit or at least one threshold value based on the acquired color information of the object, and determining proximity or remoteness of the object based on the light scattered or reflected from the object received by a light receiving unit, by using the determined output intensity of the light emitting unit or the at least one threshold value.

The determining of proximity or remoteness of the object relative to the electronic device may include fixing the at least one threshold value as a set value when selecting the output intensity of the light emitting unit based on the color information of the object; outputting light of at least one wavelength band through the light emitting unit, under the selected output intensity of the light emitting unit; receiving at least a part of light scattered or reflected from the object through the light receiving unit, wherein the proximity or remoteness of the object is determined by comparing a value corresponding to the light received by the light receiving unit and the fixed at least one threshold value.

The determining of proximity or remoteness of the object relative to the electronic device may include fixing the output intensity of the light emitting unit as a set value when selecting the at least one threshold value based on the color information of the object; outputting light of at least one wavelength band through the light emitting unit with the fixed output intensity; receiving at least a part of light scattered or reflected from the object through the light receiving unit, wherein the proximity or remoteness of the object is determined by comparing a value corresponding to the light received by the light receiving unit and the selected at least one threshold value.

Determining the proximity or remoteness of the object relative to the electronic device may include determining a first threshold value selected based on the color information of the object and a second threshold value which is less than the first threshold value, outputting light through the light emitting unit with the fixed output intensity and receiving at least a part of light scattered or reflected from the object through the light receiving unit, when a value corresponding to the received light is greater than the first threshold value, recognizing that the object is located in the proximity of the electronic device, and, after recognizing that the object is located in the proximity of the electronic device, when a value corresponding to light received through the light receiving unit is less than the second threshold value, recognizing that the object is not located in the proximity of the electronic device.

The method may further include, when it is determined that the object is in the proximity of the electronic device, deactivating a display installed in the electronic device.

Acquiring the color information of the object may include acquiring the color information of the object through a spectrum sensor or an image sensor included in the electronic device.

A method for operating of an electronic device may include, when a specific application is executed, selecting a color sensing mode, based on the color sensing mode, outputting light of at least one wavelength band through a light emitting unit, based on the color sensing mode, receiving at least a part of light scattered or reflected from an object through a light receiving unit; based on the color sensing mode, determining a color of the object from the light received through the light receiving unit, when the color of the object is determined, selecting a proximity sensing mode, based on the proximity sensing mode, outputting light of at least one wavelength band through the light emitting unit, based on the proximity sensing mode, receiving at least a part of light scattered or reflected from the object through the light receiving unit, based on the proximity sensing mode, and determining proximity or remoteness of the object by comparing a value corresponding the light received through the light receiving unit and at least one threshold value, wherein an output intensity of the light emitting unit or the at least one threshold value is determined based on the determined color or the object.

Embodiments of the present disclosure may be prepared by a program which can be executed in a computer, and may be implemented in a generic digital computer which operates the program using a computer readable recording medium. In addition, the structure of the data used in the above-described embodiments of the present disclosure may be recorded on a computer readable recording medium through various means. The computer readable recording medium may include a storage medium such as a magnetic storage medium, such as a read only memory (ROM), a floppy disk, or a hard disk and an optical reading medium, such as a CD-ROM or a DVD.

Embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an application specific integrated chip (ASIC) or field programmable gate array (FPGA). As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. An electronic device comprising:
   at least one sensor including a light emitting unit and a light receiving unit;
   a processor electrically connected with the at least one sensor; and
   a memory electrically connected with the processor and storing instructions,
   wherein, the instructions, when being executed, cause the processor to:
   control the light emitting unit to emit a light with a first intensity;
   control the at least one sensor to receive a reflective light of the light which is reflected from an object;
   change, based on color information of the reflective light, an intensity of the light being emitted from the light emitting unit from the first intensity to a second intensity distinct from the first intensity;
   control the light receiving unit to receive a reflective light of the changed light which is reflected from the object; and
   determine, based on an intensity of the reflective light of the changed light, whether the object is within a predetermined distance from the electronic device.

2. The electronic device of claim 1, wherein the instructions further cause the processor to:
   fix at least one threshold value as a set value when changing the intensity of the light emitting unit based on the color information; and
   determine, to change the function being provided by the electronic device, the proximity or remoteness of the object by comparing the intensity of the reflective light and the fixed at least one threshold value.

3. The electronic device of claim 1, wherein the at least one sensor comprises a spectrum sensor or an image sensor.

4. The electronic device of claim 3, wherein the spectrum sensor is at least a part of the light emitting unit and the light receiving unit.

5. The electronic device of claim 4, wherein the at least one sensor comprises a proximity sensor including the spectrum sensor, the light emitting unit, and the light receiving unit.

6. The electronic device of claim 1, further comprising:
   a housing; and
   a display exposed through one surface of the housing,
   wherein the light receiving unit and the light emitting unit are disposed on a periphery of the display.

7. The electronic device of claim 1, wherein, when it is determined that the object is in the proximity of the electronic device, the instructions cause the processor to deactivate a display installed in the electronic device.

8. The electronic device of claim 1, wherein the instructions further cause the processor to acquire, when execution of a specific application is sensed, the color information of the object using the at least one sensor, to determine the output intensity of the light emitting unit or the at least one threshold value based on the acquired color information of the object, and to determine the proximity or remoteness of the object based on light received by the light receiving unit, by using the determined output intensity of the light emitting unit or the at least one threshold value.

9. The electronic device of claim 8, wherein the specific application comprises a call-related application.

10. The electronic device of claim 1, wherein the at least one wavelength band comprises at least one of peak sensitivity wavelengths of 940 nanometers and 950 nanometers.

11. The electronic device of claim 1, wherein the at least one sensor outputs light and generates the color information of the object using light scattered or reflected from the object, and wherein light outputted from the at least one sensor comprises a wavelength band of at least one of peak sensitivity wavelengths of 568, 660, and 880 nanometers.

12. A method for operating of an electronic device including at least one sensor, the method comprising:

emitting, by a light emitting unit included in the at least one sensor, a light with a first intensity;

receiving, by the at least one sensor, a reflective light of the light which is reflected from an object;

changing, based on color information of the reflective light, an intensity of the light being emitted from the light emitting unit from the first intensity to a second intensity distinct from the first intensity;

receiving, by a light receiving unit included in the at least one sensor, a reflective light of the changed light which is reflected from the object; and determining, based on an intensity of the reflective light of the changed light, whether the object is within a pre-determined distance from the electronic device.

13. The method of claim 12, wherein determining proximity or remoteness of the object relative to the electronic device comprises:

fixing at least one threshold value as a set value when changing the intensity of the light emitting unit based on the color information;

determining, to change the function being provided by the electronic device, the proximity or remoteness of the object by comparing the intensity of the reflective light and the fixed at least one threshold value.

14. The method of claim 12, wherein the color information is acquired through a spectrum sensor or an image sensor included in the electronic device.

* * * * *